(12) United States Patent
Tendick et al.

(10) Patent No.: US 8,504,534 B1
(45) Date of Patent: Aug. 6, 2013

(54) DATABASE STRUCTURES AND ADMINISTRATION TECHNIQUES FOR GENERALIZED LOCALIZATION OF DATABASE ITEMS

(75) Inventors: Patrick Tendick, Basking Ridge, NJ (US); Rodney A. Thomson, Westminster, CO (US); David Zanoni, Bethlehem, PA (US)

(73) Assignee: Avaya Inc., Basking Ridge, NJ (US)

( * ) Notice: Subject to any disclaimer, the term of this patent is extended or adjusted under 35 U.S.C. 154(b) by 818 days.

(21) Appl. No.: 11/861,857

(22) Filed: Sep. 26, 2007

(51) Int. Cl.
*G06F 17/30* (2006.01)
*G06F 17/20* (2006.01)

(52) U.S. Cl.
USPC .......................................... 707/694; 717/100

(58) Field of Classification Search
USPC .......................................... 707/694; 717/100
See application file for complete search history.

(56) References Cited

U.S. PATENT DOCUMENTS

| | | |
|---|---|---|
| 4,163,124 A | 7/1979 | Jolissaint |
| 4,510,351 A | 4/1985 | Costello et al. |
| 4,567,323 A | 1/1986 | Lottes et al. |
| 4,737,983 A | 4/1988 | Frauenthal et al. |
| 4,797,911 A | 1/1989 | Szlam et al. |
| 4,894,857 A | 1/1990 | Szlam et al. |
| 5,001,710 A | 3/1991 | Gawrys et al. |
| 5,097,528 A | 3/1992 | Gursahaney et al. |
| 5,101,425 A | 3/1992 | Darland |
| 5,155,761 A | 10/1992 | Hammond |
| 5,164,981 A | 11/1992 | Mitchell et al. |
| 5,164,983 A | 11/1992 | Brown et al. |
| 5,167,010 A | 11/1992 | Elm et al. |
| 5,185,780 A | 2/1993 | Leggett |
| 5,206,903 A | 4/1993 | Kohler et al. |
| 5,210,789 A | 5/1993 | Jeffus et al. |
| 5,274,700 A | 12/1993 | Gechter et al. |
| 5,278,898 A | 1/1994 | Cambray et al. |
| 5,289,368 A | 2/1994 | Jordan et al. |
| 5,291,550 A | 3/1994 | Levy et al. |
| 5,299,260 A | 3/1994 | Shaio |
| 5,309,513 A | 5/1994 | Rose |
| 5,311,422 A | 5/1994 | Loftin et al. |
| 5,325,292 A | 6/1994 | Crockett |
| 5,335,268 A | 8/1994 | Kelly, Jr. et al. |
| 5,335,269 A | 8/1994 | Steinlicht |
| 5,390,243 A | 2/1995 | Casselman et al. |
| 5,436,965 A | 7/1995 | Grossman et al. |

(Continued)

FOREIGN PATENT DOCUMENTS

| | | |
|---|---|---|
| CA | 2143198 | 1/1995 |
| CA | 2174762 | 3/1996 |

(Continued)

OTHER PUBLICATIONS

Bischoff et al. "Data Ware House Building Method—practical advices telled by persons having experience and experts", Kyouritsu Shuppan Corp. May 30, 2000, first edition, pp. 197-216.

(Continued)

*Primary Examiner* — Amresh Singh
(74) *Attorney, Agent, or Firm* — Sheridan Ross P.C.

(57) ABSTRACT

The present invention is directed to a data model for effecting transformations of entities from a first form of expression to a second different form of expression.

17 Claims, 9 Drawing Sheets

U.S. PATENT DOCUMENTS

| | | |
|---|---|---|
| 5,444,774 A | 8/1995 | Friedes |
| 5,467,391 A | 11/1995 | Donaghue, Jr. et al. |
| 5,469,503 A | 11/1995 | Butensky et al. |
| 5,469,504 A | 11/1995 | Blaha |
| 5,473,773 A | 12/1995 | Aman et al. |
| 5,479,497 A | 12/1995 | Kovarik |
| 5,499,291 A | 3/1996 | Kepley |
| 5,500,795 A | 3/1996 | Powers et al. |
| 5,504,894 A | 4/1996 | Ferguson et al. |
| 5,506,898 A | 4/1996 | Costantini et al. |
| 5,530,744 A | 6/1996 | Charalambous et al. |
| 5,537,470 A | 7/1996 | Lee |
| 5,537,542 A | 7/1996 | Eilert et al. |
| 5,544,232 A | 8/1996 | Baker et al. |
| 5,546,452 A | 8/1996 | Andrews et al. |
| 5,555,299 A | 9/1996 | Maloney et al. |
| 5,577,169 A | 11/1996 | Prezioso |
| 5,592,378 A | 1/1997 | Cameron et al. |
| 5,592,542 A | 1/1997 | Honda et al. |
| 5,594,726 A | 1/1997 | Thompson et al. |
| 5,603,029 A | 2/1997 | Aman et al. |
| 5,604,892 A | 2/1997 | Nuttall et al. |
| 5,606,361 A | 2/1997 | Davidsohn et al. |
| 5,611,076 A | 3/1997 | Durflinger et al. |
| 5,627,884 A | 5/1997 | Williams et al. |
| 5,642,515 A | 6/1997 | Jones et al. |
| 5,673,205 A | 9/1997 | Brunson |
| 5,684,872 A | 11/1997 | Flockhart et al. |
| 5,684,964 A | 11/1997 | Powers et al. |
| 5,689,698 A | 11/1997 | Jones et al. |
| 5,703,943 A | 12/1997 | Otto |
| 5,713,014 A | 1/1998 | Durflinger et al. |
| 5,721,770 A | 2/1998 | Kohler |
| 5,724,092 A | 3/1998 | Davidsohn et al. |
| 5,740,238 A | 4/1998 | Flockhart et al. |
| 5,742,675 A | 4/1998 | Kilander et al. |
| 5,742,763 A | 4/1998 | Jones |
| 5,748,468 A | 5/1998 | Notenboom et al. |
| 5,749,079 A | 5/1998 | Yong et al. |
| 5,751,707 A | 5/1998 | Voit et al. |
| 5,752,027 A | 5/1998 | Familiar |
| 5,754,639 A | 5/1998 | Flockhart et al. |
| 5,754,776 A | 5/1998 | Hales et al. |
| 5,754,841 A | 5/1998 | Carino, Jr. |
| 5,757,904 A | 5/1998 | Anderson |
| 5,781,614 A | 7/1998 | Brunson |
| 5,784,452 A | 7/1998 | Carney |
| 5,787,410 A * | 7/1998 | McMahon ................ 707/760 |
| 5,790,642 A | 8/1998 | Taylor et al. |
| 5,790,650 A | 8/1998 | Dunn et al. |
| 5,790,677 A | 8/1998 | Fox et al. |
| 5,794,250 A | 8/1998 | Carino, Jr. et al. |
| 5,796,393 A | 8/1998 | MacNaughton et al. |
| 5,802,282 A | 9/1998 | Hales et al. |
| 5,802,510 A | 9/1998 | Jones |
| 5,818,907 A | 10/1998 | Maloney et al. |
| 5,819,084 A | 10/1998 | Shapiro et al. |
| 5,825,869 A | 10/1998 | Brooks et al. |
| 5,826,039 A | 10/1998 | Jones |
| 5,828,747 A | 10/1998 | Fisher et al. |
| 5,836,011 A | 11/1998 | Hambrick et al. |
| 5,838,968 A | 11/1998 | Culbert |
| 5,839,117 A | 11/1998 | Cameron et al. |
| 5,864,874 A | 1/1999 | Shapiro |
| 5,875,437 A | 2/1999 | Atkins |
| 5,880,720 A | 3/1999 | Iwafune et al. |
| 5,881,238 A | 3/1999 | Aman et al. |
| 5,884,032 A | 3/1999 | Bateman et al. |
| 5,889,956 A | 3/1999 | Hauser et al. |
| 5,897,622 A | 4/1999 | Blinn et al. |
| 5,903,641 A | 5/1999 | Tonisson |
| 5,903,877 A | 5/1999 | Berkowitz et al. |
| 5,905,793 A | 5/1999 | Flockhart et al. |
| 5,909,669 A | 6/1999 | Havens |
| 5,911,134 A | 6/1999 | Castonguay et al. |
| 5,914,951 A | 6/1999 | Bentley et al. |
| 5,915,012 A | 6/1999 | Miloslavsky |
| 5,923,745 A | 7/1999 | Hurd |
| 5,926,538 A | 7/1999 | Deryugin et al. |
| 5,930,786 A | 7/1999 | Carino, Jr. et al. |
| 5,937,051 A | 8/1999 | Hurd et al. |
| 5,937,402 A | 8/1999 | Pandit |
| 5,940,496 A | 8/1999 | Gisby et al. |
| 5,943,416 A | 8/1999 | Gisby |
| 5,948,065 A | 9/1999 | Eilert et al. |
| 5,960,073 A | 9/1999 | Kikinis et al. |
| 5,963,635 A | 10/1999 | Szlam et al. |
| 5,963,911 A | 10/1999 | Walker et al. |
| 5,970,132 A | 10/1999 | Brady |
| 5,974,135 A | 10/1999 | Breneman et al. |
| 5,974,462 A | 10/1999 | Aman et al. |
| 5,982,873 A | 11/1999 | Flockhart et al. |
| 5,987,117 A | 11/1999 | McNeil et al. |
| 5,991,392 A | 11/1999 | Miloslavsky |
| 5,996,013 A | 11/1999 | Delp et al. |
| 5,999,963 A | 12/1999 | Bruno et al. |
| 6,000,832 A | 12/1999 | Franklin et al. |
| 6,011,844 A | 1/2000 | Uppaluru et al. |
| 6,014,437 A | 1/2000 | Acker et al. |
| 6,031,896 A | 2/2000 | Gardell et al. |
| 6,038,293 A | 3/2000 | McNerney et al. |
| 6,038,296 A | 3/2000 | Brunson et al. |
| 6,044,144 A | 3/2000 | Becker et al. |
| 6,044,205 A | 3/2000 | Reed et al. |
| 6,044,355 A | 3/2000 | Crockett et al. |
| 6,049,547 A | 4/2000 | Fisher et al. |
| 6,049,779 A | 4/2000 | Berkson |
| 6,052,723 A | 4/2000 | Ginn |
| 6,055,308 A | 4/2000 | Miloslavsky et al. |
| 6,064,730 A | 5/2000 | Ginsberg |
| 6,064,731 A | 5/2000 | Flockhart et al. |
| 6,084,954 A | 7/2000 | Harless et al. |
| 6,088,441 A | 7/2000 | Flockhart et al. |
| 6,108,670 A | 8/2000 | Weida et al. |
| 6,115,462 A | 9/2000 | Servi et al. |
| 6,128,304 A | 10/2000 | Gardell et al. |
| 6,151,571 A | 11/2000 | Pertrushin |
| 6,154,769 A | 11/2000 | Cherkasova et al. |
| 6,163,607 A | 12/2000 | Bogart et al. |
| 6,173,053 B1 | 1/2001 | Bogart et al. |
| 6,175,564 B1 | 1/2001 | Miloslavsky et al. |
| 6,178,441 B1 | 1/2001 | Elnozahy |
| 6,185,292 B1 | 2/2001 | Miloslavsky |
| 6,185,603 B1 | 2/2001 | Henderson et al. |
| 6,192,122 B1 | 2/2001 | Flockhart et al. |
| 6,215,865 B1 | 4/2001 | McCalmont |
| 6,226,377 B1 | 5/2001 | Donaghue, Jr. |
| 6,229,819 B1 | 5/2001 | Darland et al. |
| 6,230,183 B1 | 5/2001 | Yocom et al. |
| 6,233,333 B1 | 5/2001 | Dezonmo |
| 6,240,417 B1 | 5/2001 | Eastwick et al. |
| 6,259,969 B1 | 7/2001 | Tackett et al. |
| 6,263,359 B1 | 7/2001 | Fong et al. |
| 6,272,544 B1 | 8/2001 | Mullen |
| 6,275,806 B1 | 8/2001 | Pertrushin |
| 6,275,812 B1 | 8/2001 | Haq et al. |
| 6,275,991 B1 | 8/2001 | Erlin |
| 6,278,777 B1 | 8/2001 | Morley et al. |
| 6,292,550 B1 | 9/2001 | Burritt |
| 6,295,353 B1 | 9/2001 | Flockhart et al. |
| 6,298,062 B1 | 10/2001 | Gardell et al. |
| 6,307,931 B1 | 10/2001 | Vaudreuil |
| 6,324,282 B1 | 11/2001 | McIllwaine et al. |
| 6,332,081 B1 | 12/2001 | Do |
| 6,339,754 B1 | 1/2002 | Flanagan et al. |
| 6,353,810 B1 | 3/2002 | Petrushin |
| 6,356,632 B1 | 3/2002 | Foster et al. |
| 6,360,222 B1 | 3/2002 | Quinn |
| 6,366,666 B2 | 4/2002 | Bengtson et al. |
| 6,366,668 B1 | 4/2002 | Borst et al. |
| 6,389,028 B1 | 5/2002 | Bondarenko et al. |
| 6,389,132 B1 | 5/2002 | Price |
| 6,389,400 B1 | 5/2002 | Bushey et al. |
| 6,408,066 B1 | 6/2002 | Andruska et al. |
| 6,408,277 B1 | 6/2002 | Nelken |
| 6,411,682 B1 | 6/2002 | Fuller et al. |
| 6,424,709 B1 | 7/2002 | Doyle et al. |

| Patent No. | Date | Name |
|---|---|---|
| 6,426,950 B1 | 7/2002 | Mistry |
| 6,427,137 B2 | 7/2002 | Petrushin |
| 6,430,282 B1 | 8/2002 | Bannister et al. |
| 6,434,230 B1 | 8/2002 | Gabriel |
| 6,446,092 B1 | 9/2002 | Sutter |
| 6,449,356 B1 | 9/2002 | Dezonno |
| 6,449,358 B1 | 9/2002 | Anisimov et al. |
| 6,449,646 B1 | 9/2002 | Sikora et al. |
| 6,453,038 B1 | 9/2002 | McFarlane et al. |
| 6,463,148 B1 | 10/2002 | Brady |
| 6,463,346 B1 | 10/2002 | Flockhart et al. |
| 6,463,415 B2 | 10/2002 | St. John |
| 6,463,471 B1 | 10/2002 | Dreke et al. |
| 6,480,826 B2 | 11/2002 | Pertrushin |
| 6,490,350 B2 | 12/2002 | McDuff et al. |
| 6,535,600 B1 | 3/2003 | Fisher et al. |
| 6,535,601 B1 | 3/2003 | Flockhart et al. |
| 6,553,114 B1 | 4/2003 | Fisher et al. |
| 6,556,974 B1 | 4/2003 | D'Alessandro |
| 6,560,330 B2 | 5/2003 | Gabriel |
| 6,560,649 B1 | 5/2003 | Mullen et al. |
| 6,560,707 B2 | 5/2003 | Curtis et al. |
| 6,563,920 B1 | 5/2003 | Flockhart et al. |
| 6,563,921 B1 | 5/2003 | Williams et al. |
| 6,571,285 B1 | 5/2003 | Groath et al. |
| 6,574,599 B1 | 6/2003 | Lim et al. |
| 6,574,605 B1 | 6/2003 | Sanders et al. |
| 6,597,685 B2 | 7/2003 | Miloslavsky et al. |
| 6,603,854 B1 | 8/2003 | Judkins et al. |
| 6,604,084 B1 | 8/2003 | Powers et al. |
| 6,614,903 B1 | 9/2003 | Flockhart et al. |
| 6,650,748 B1 | 11/2003 | Edwards et al. |
| 6,662,188 B1 | 12/2003 | Rasmussen et al. |
| 6,668,167 B2 | 12/2003 | McDowell et al. |
| 6,675,168 B2 | 1/2004 | Shapiro et al. |
| 6,684,192 B2 | 1/2004 | Honarvar et al. |
| 6,697,457 B2 | 2/2004 | Petrushin |
| 6,700,967 B2 | 3/2004 | Kleinoder et al. |
| 6,704,409 B1 | 3/2004 | Dilip et al. |
| 6,707,903 B2 | 3/2004 | Burok et al. |
| 6,711,253 B1 | 3/2004 | Prabhaker |
| 6,724,885 B1 | 4/2004 | Deutsch et al. |
| 6,735,299 B2 | 5/2004 | Krimstock et al. |
| 6,735,593 B1 | 5/2004 | Williams |
| 6,738,462 B1 | 5/2004 | Brunson |
| 6,744,877 B1 | 6/2004 | Edwards |
| 6,754,333 B1 | 6/2004 | Flockhart et al. |
| 6,757,362 B1 | 6/2004 | Cooper et al. |
| 6,766,013 B2 | 7/2004 | Flockhart et al. |
| 6,766,014 B2 | 7/2004 | Flockhart et al. |
| 6,766,326 B1 | 7/2004 | Cena |
| 6,775,377 B2 | 8/2004 | McIllwaine et al. |
| 6,785,666 B1 | 8/2004 | Nareddy et al. |
| 6,822,945 B2 | 11/2004 | Petrovykh |
| 6,829,348 B1 | 12/2004 | Schroeder et al. |
| 6,839,735 B2 | 1/2005 | Wong et al. |
| 6,842,503 B1 | 1/2005 | Wildfeuer |
| 6,847,973 B2 | 1/2005 | Griffin et al. |
| 6,898,190 B2 | 5/2005 | Shtivelman et al. |
| 6,915,305 B2 | 7/2005 | Subramanian et al. |
| 6,947,543 B2 | 9/2005 | Alvarado et al. |
| 6,947,988 B1 | 9/2005 | Saleh |
| 6,963,826 B2 | 11/2005 | Hanaman et al. |
| 6,968,052 B2 | 11/2005 | Wullert, II |
| 6,981,061 B1 | 12/2005 | Sakakura |
| 6,985,901 B1 | 1/2006 | Sachse et al. |
| 6,988,126 B2 | 1/2006 | Wilcock et al. |
| 7,010,542 B2 | 3/2006 | Trappen et al. |
| 7,020,254 B2 | 3/2006 | Phillips |
| 7,035,808 B1 | 4/2006 | Ford |
| 7,035,927 B2 | 4/2006 | Flockhart et al. |
| 7,039,176 B2 | 5/2006 | Borodow et al. |
| 7,054,434 B2 | 5/2006 | Rodenbusch et al. |
| 7,062,031 B2 | 6/2006 | Becerra et al. |
| 7,076,051 B2 | 7/2006 | Brown et al. |
| 7,100,200 B2 | 8/2006 | Pope et al. |
| 7,103,562 B2 | 9/2006 | Kosiba et al. |
| 7,110,525 B1 | 9/2006 | Heller et al. |
| 7,117,193 B1 | 10/2006 | Basko et al. |
| 7,127,058 B2 | 10/2006 | O'Connor et al. |
| 7,136,873 B2 | 11/2006 | Smith et al. |
| 7,149,733 B2 | 12/2006 | Lin et al. |
| 7,155,612 B2 | 12/2006 | Licis |
| 7,158,628 B2 | 1/2007 | McConnell et al. |
| 7,162,469 B2 | 1/2007 | Anonsen et al. |
| 7,165,075 B2 | 1/2007 | Harter et al. |
| 7,170,976 B1 | 1/2007 | Keagy |
| 7,170,992 B2 | 1/2007 | Knott et al. |
| 7,177,401 B2 | 2/2007 | Mundra et al. |
| 7,200,219 B1 | 4/2007 | Edwards et al. |
| 7,203,655 B2 | 4/2007 | Herbert et al. |
| 7,212,625 B1 | 5/2007 | McKenna et |
| 7,215,744 B2 | 5/2007 | Scherer |
| 7,222,075 B2 | 5/2007 | Petrushin |
| 7,246,371 B2 | 7/2007 | Diacakis et al. |
| 7,257,513 B2 | 8/2007 | Lilly |
| 7,257,597 B1 | 8/2007 | Pryce et al. |
| 7,266,508 B1 | 9/2007 | Owen et al. |
| 7,283,805 B2 | 10/2007 | Agrawal |
| 7,295,669 B1 | 11/2007 | Denton et al. |
| 7,299,259 B2 | 11/2007 | Petrovykh |
| 7,324,954 B2 | 1/2008 | Calderaro et al. |
| 7,340,408 B1 | 3/2008 | Drew et al. |
| 7,373,341 B2 * | 5/2008 | Polo-Malouvier ..................... 1/1 |
| 7,376,127 B2 | 5/2008 | Hepworth et al. |
| 7,386,100 B2 | 6/2008 | Michaelis |
| 7,392,402 B2 | 6/2008 | Suzuki |
| 7,418,093 B2 | 8/2008 | Knott et al. |
| 7,499,844 B2 | 3/2009 | Whitman, Jr. |
| 7,545,761 B1 | 6/2009 | Kalbag |
| 7,545,925 B2 | 6/2009 | Williams |
| 7,885,209 B1 | 2/2011 | Michaelis et al. |
| 7,936,867 B1 | 5/2011 | Hill et al. |
| 2001/0011228 A1 | 8/2001 | Shenkman |
| 2001/0034628 A1 | 10/2001 | Eder |
| 2001/0056349 A1 | 12/2001 | St. John |
| 2002/0002464 A1 | 1/2002 | Pertrushin |
| 2002/0010587 A1 | 1/2002 | Pertrushin |
| 2002/0019829 A1 | 2/2002 | Shapiro |
| 2002/0021307 A1 | 2/2002 | Glenn et al. |
| 2002/0035605 A1 | 3/2002 | McDowell et al. |
| 2002/0038422 A1 | 3/2002 | Suwamoto et al. |
| 2002/0065894 A1 | 5/2002 | Dalal et al. |
| 2002/0076010 A1 | 6/2002 | Sahai |
| 2002/0085701 A1 | 7/2002 | Parsons et al. |
| 2002/0087630 A1 | 7/2002 | Wu |
| 2002/0112186 A1 | 8/2002 | Ford et al. |
| 2002/0116336 A1 | 8/2002 | Diacakis et al. |
| 2002/0116461 A1 | 8/2002 | Diacakis et al. |
| 2002/0123923 A1 | 9/2002 | Manganaris et al. |
| 2002/0147730 A1 | 10/2002 | Kohno |
| 2002/0194096 A1 | 12/2002 | Falcone et al. |
| 2003/0004704 A1 * | 1/2003 | Baron ............... 704/8 |
| 2003/0014491 A1 | 1/2003 | Horvitz et al. |
| 2003/0028621 A1 | 2/2003 | Furlong et al. |
| 2003/0073440 A1 | 4/2003 | Mukherjee et al. |
| 2003/0093465 A1 | 5/2003 | Banerjee et al. |
| 2003/0108186 A1 | 6/2003 | Brown et al. |
| 2003/0144900 A1 | 7/2003 | Whitmer |
| 2003/0144959 A1 | 7/2003 | Makita |
| 2003/0174830 A1 | 9/2003 | Boyer et al. |
| 2003/0177017 A1 | 9/2003 | Boyer et al. |
| 2003/0231757 A1 | 12/2003 | Harkreader et al. |
| 2004/0008828 A1 | 1/2004 | Coles et al. |
| 2004/0015496 A1 | 1/2004 | Anonsen |
| 2004/0015506 A1 | 1/2004 | Anonsen et al. |
| 2004/0054743 A1 | 3/2004 | McPartlan et al. |
| 2004/0057569 A1 | 3/2004 | Busey et al. |
| 2004/0102940 A1 | 5/2004 | Lendermann et al. |
| 2004/0103324 A1 | 5/2004 | Band |
| 2004/0138944 A1 | 7/2004 | Whitacre et al. |
| 2004/0162998 A1 | 8/2004 | Tuomi et al. |
| 2004/0193646 A1 | 9/2004 | Cuckson et al. |
| 2004/0202308 A1 | 10/2004 | Baggenstoss et al. |
| 2004/0202309 A1 | 10/2004 | Baggenstoss et al. |
| 2004/0203878 A1 | 10/2004 | Thomson |
| 2004/0210475 A1 | 10/2004 | Starnes et al. |
| 2004/0240659 A1 | 12/2004 | Gagle et al. |

| | | |
|---|---|---|
| 2004/0249650 A1 | 12/2004 | Freedman et al. |
| 2004/0260706 A1 | 12/2004 | Anonsen et al. |
| 2005/0021529 A1 | 1/2005 | Hodson et al. |
| 2005/0027612 A1 | 2/2005 | Walker et al. |
| 2005/0044375 A1 | 2/2005 | Paatero et al. |
| 2005/0049911 A1 | 3/2005 | Engelking et al. |
| 2005/0065837 A1 | 3/2005 | Kosiba et al. |
| 2005/0071211 A1 | 3/2005 | Flockhart et al. |
| 2005/0071212 A1 | 3/2005 | Flockhart et al. |
| 2005/0071241 A1 | 3/2005 | Flockhart et al. |
| 2005/0071844 A1 | 3/2005 | Flockhart et al. |
| 2005/0091071 A1 | 4/2005 | Lee |
| 2005/0125432 A1 | 6/2005 | Lin et al. |
| 2005/0125458 A1 | 6/2005 | Sutherland et al. |
| 2005/0138064 A1 | 6/2005 | Trappen et al. |
| 2005/0154708 A1 | 7/2005 | Sun |
| 2005/0182784 A1 | 8/2005 | Trappen et al. |
| 2005/0228707 A1 | 10/2005 | Hendrickson |
| 2005/0261035 A1 | 11/2005 | Groskreutz et al. |
| 2005/0283393 A1 | 12/2005 | White et al. |
| 2005/0289446 A1 | 12/2005 | Moncsko et al. |
| 2006/0004686 A1 | 1/2006 | Molnar et al. |
| 2006/0007916 A1 | 1/2006 | Jones et al. |
| 2006/0015388 A1 | 1/2006 | Flockhart et al. |
| 2006/0026049 A1 | 2/2006 | Joseph et al. |
| 2006/0056598 A1 | 3/2006 | Brandt et al. |
| 2006/0058049 A1 | 3/2006 | McLaughlin et al. |
| 2006/0100973 A1* | 5/2006 | McMaster et al. ............. 707/1 |
| 2006/0135058 A1 | 6/2006 | Karabinis |
| 2006/0167667 A1 | 7/2006 | Maturana et al. |
| 2006/0178994 A1 | 8/2006 | Stolfo et al. |
| 2006/0242160 A1 | 10/2006 | Kanchwalla et al. |
| 2006/0256957 A1 | 11/2006 | Fain et al. |
| 2006/0271418 A1 | 11/2006 | Hackbarth et al. |
| 2006/0285648 A1 | 12/2006 | Wahl et al. |
| 2007/0038632 A1 | 2/2007 | Engstrom |
| 2007/0064912 A1 | 3/2007 | Kagan et al. |
| 2007/0083572 A1 | 4/2007 | Bland et al. |
| 2007/0112953 A1 | 5/2007 | Barnett |
| 2007/0127643 A1 | 6/2007 | Keagy |
| 2007/0156375 A1 | 7/2007 | Meier et al. |
| 2007/0192414 A1 | 8/2007 | Chen et al. |
| 2007/0201311 A1 | 8/2007 | Olson |
| 2007/0201674 A1 | 8/2007 | Annadata et al. |
| 2007/0230681 A1 | 10/2007 | Boyer et al. |
| 2008/0056165 A1 | 3/2008 | Petrovykh |
| 2009/0228474 A1 | 9/2009 | Chiu et al. |
| 2011/0075821 A1 | 3/2011 | Michaelis |

FOREIGN PATENT DOCUMENTS

| | | |
|---|---|---|
| EP | 0501189 | 9/1992 |
| EP | 0576205 | 12/1993 |
| EP | 0740450 | 10/1996 |
| EP | 0770967 | 5/1997 |
| EP | 0772335 | 5/1997 |
| EP | 0829996 | 3/1998 |
| EP | 0855826 | 7/1998 |
| EP | 0863651 | 9/1998 |
| EP | 0866407 | 9/1998 |
| EP | 899673 | 3/1999 |
| EP | 998108 | 5/2000 |
| EP | 1035718 | 9/2000 |
| EP | 1091307 | 4/2001 |
| EP | 1150236 | 10/2001 |
| EP | 1761078 | 3/2007 |
| GB | 2273418 | 6/1994 |
| GB | 2290192 | 12/1995 |
| JP | 07-007573 | 1/1995 |
| JP | 2001-053843 | 2/2001 |
| JP | 2002-032977 | 1/2002 |
| JP | 2002-304313 | 10/2002 |
| JP | 2006-054864 | 2/2006 |
| WO | WO 96/07141 | 3/1996 |
| WO | WO 97/28635 | 8/1997 |
| WO | WO 98/56207 | 12/1998 |
| WO | WO 99/17522 | 4/1999 |
| WO | WO 00/26804 | 5/2000 |
| WO | WO 00/26816 | 5/2000 |
| WO | WO 01/80094 | 10/2001 |
| WO | WO 02/099640 | 12/2002 |
| WO | WO 03/015425 | 2/2003 |

OTHER PUBLICATIONS

Koutarou, "Building a Framework for EC using Hibernate, OSWorkflow", JAVA Press, Japan, Gujutsu Hyouron Company, vol. 25, 2004, pp. 132-147.

Microsoft R Access 97 for Windows R Application development guide, Ver. 8.0, Microsoft Corp., a first version, pp. 569-599.

Seo, "akuto/FC shop sale assistant systme etc., compressing into halves the number of days for stock possession by a multi-bender EPR plus POS", Network Computing, Japan Licktelecom Corp., vol. 12, No. 4, Apr. 1, 2000, pp. 45-49.

US 6,537,685, Mar. 18, 2003, Fisher et al. (withdrawn).

U.S. Appl. No. 11/087,290, filed Mar. 22, 2005, Michaelis.

U.S. Appl. No. 11/199,828, filed Aug. 8, 2005, Bland et al.

U.S. Appl. No. 11/245,724, filed Oct. 6, 2005, Flockhart et al.

U.S. Appl. No. 11/517,646, filed Sep. 7, 2006, Hackbarth et al.

U.S. Appl. No. 11/536,456, filed Sep. 28, 2006, Hackbarth et al.

Creating and Using Data Warehouse Dimension Tables (Microsoft) copyright 2005, http://msdn.microsoft.com/library/en-us/createdw/createdw_10kz.asp?frame=true, 3 pages.

G. Hellstrom et al., "RFC 2793—RTP Payload for Text Consersation," Network Working Group Request for Comments 2793 (May 2000), available at http://www.faqs.org/rfcs/rfc2793.html, 8 pages.

H. Schulzrinne et al., "RFC 2833—RTP Payload for DTMF Digits, Telephony Tones and Telephony Signals," Network Working Group Request for Comments 2833 (May 2000), available at http://www.faqs.org/rfcs/rfc2833.html, 23 pages.

Intelligent Enterprise Magazine—Data Warehouse Designer: Fact Tables and Dimension, downloaded May 18, 2005, http://www.intelligententerprise.com/030101/602warehouse1_1.jhtml, 7 pages.

Aspect—"Analysis and Reporting," http://aspect.com/products/analysis/index.cfm, (Copyright 2005) (1page).

Aspect—"Call Center Reports," http://aspect.com/products/analysis/ccreporting.cfm, (Copyright 2005) (2 pages).

Aspect—"Performance Optimization," http://aspect.com/products/wfm/performanceopt.cfm?section=performanceopt, (Copyright 2005) (1page).

Avaya—"Avaya and Blue Pumpkin—Providing Workforce Optimization Solutions" (Copyright 2004) (3 pages).

Avaya—"Avaya and Texas Digital Systems—Providing Real-time Access to Call Statistics" (Copyright 2004) (3 pages).

Avaya—"Avaya Basic Call Management System Reporting Desktop" (Copyright 2002) (4 pages).

Avaya—"Avaya Call Management System" (Copyright 2003) (3 pages).

Avaya—"Basic Call Management System Reporting Desktop," Product Description, http://www.avaya.com/gcm/master-usa/en-us/products/offers/bcmrs_desktop.htm (Copyright 2005) (2 pages).

Avaya—"Basic Call Management System Reporting Desktop," Product Features, http://www.avaya.com/gcm/master-usa/en-us/products/offers/bcmrs_desktop.htm (Copyright 2005) (2 pages).

Avaya—"Basic Call Management System Reporting Desktop," Product Overview, http://www.avaya.com/gcm/master-usa/en-us/products/offers/bcmrs_desktop.htm (Copyright 2005) (2 pages).

Avaya—"Basic Call Management System Reporting Desktop," Product Technical, http://www.avaya.com/gcm/master-usa/en-us/products/offers/bcmrs_desktop.htm (Copyright 2005) (2 pages).

Avaya—"Call Management System," Product Description, http://www.avaya.com/gcm/master-usa/en-us/products/offers/call_management_system.htm (Copyright 2005) (2 pages).

Avaya—"Call Management System," Product Features, http://www.avaya.com/gcm/master-usa/en-us/products/offers/call_management_system.htm (Copyright 2005) (3 pages).

Avaya—"Call Management System," Product Overview, http://www.avaya.com/gcm/master-usa/en-us/products/offers/call_management_system.htm (Copyright 2005) (2 pages).

Avaya—"Call Management System," Product Technical, http://www.avaya.com/gcm/master-usa/en-us/products/offers/call_management_system.htm (Copyright 2005) (2 pages).

Avaya—"Multi Channel Product Authorization," (PA) Version 5.0, (Nov. 2003) (6 pages).
Cherry, "Anger Management," IEEE Spectrum (Apr. 2005) (1 page).
NICE Systems—"Insight from Interactions," "Overwhelmed by the Amount of Data at your Contact Center?" http://www.nice.com/products/multimedia/analyzer.php, (Printed May 19, 2005) (2 pages).
NICE Systems—"Multimedia Interaction Products," "Insight from Interactions," http://www.nice.com/products/multimedia/contact_centers.php (Printed May 19, 2005) (3 pages).
Nortel—"Centrex Internet Enabled Call Centers," http://www.products.nortel.com/go/product_assoc.jsp?segId=0&parID=0&catID=-9191&rend_id . . . (Copyright 1999-2005) (1page).
"Call Center Recording for Call Center Quality Assurance", Voice Print International, Inc., available at http://www.voiceprintonline.com/call-center-recording.asp?ad_src=google&srch_trm=call_center_monitoring, date unknown, printed May 10, 2007, 2 pages.
"KANA—Contact Center Support", available at http://www.kana.com/solutions.php?tid=46, copyright 2006, 3 pages.
"Monitoring: OneSight Call Statistics Monitors", available at http://www.empirix.com/default.asp?action=article&ID=301, date unknown, printed May 10, 2007, 2 pages.
"Oracle and Siebel" Oracle, available at http://www.oracle.com/siebel/index.html, date unknown, printed May 10, 2007, 2 pages.
Microsoft Office Animated Help Tool, date unknown, 1 page.
"Still Leaving It To Fate?: Optimizing Workforce Management", Durr, William Jr., Nov. 2001.
"Services for Computer Supported Telecommunications Applications (CSTA) Phase III"; Standard ECMA-269, 5th Edition—Dec. 2002; ECMA International Standardizing Information and Communication Systems; URL: http://www.ecma.ch; pp. 1-666 (Parts 1-8).
"Access for 9-1-1 and Telephone Emergency Services," Americans with Disabilities Act, U.S. Department of Justice, Civil Rights Division (Jul. 15, 1998), available at http://www.usdoj.gov/crt/ada/911ta.htm, 11 pages.
Andy Zmolek; "SIMPLE and Presence: Enterprise Value Propositions," Avaya presentation, 16 pages, presented Jan. 24, 2002.
Berners-Lee et al.; "Uniform Resource Identifiers (URI); Generic Syntax," Network Working Group, Request for Comments 2396 (Aug. 1998), 38 pages.
Dawson et al.; "Vcard MIME Directory Profile," Network Working Group (Sep. 1998), available at http://www.ietf.org/rfc/rfc2426.txt?number=2426, 40 pages.
Fielding et al.; "Hypertext Transfer Protocol—HTTP/1.1," Network Working Group, Request for Comments 2068 (Jan. 1997), 152 pages.
G. Klyne; "A Syntax for Describing Media Feature Sets," Network Working Group (Mar. 1999), available at http://www.ietf.org/rfc/rfc2533.txt?number=2533, 35 pages.
G. Klyne; "Protocol-independent Content Negotiation Framework," Network Working Group (Sep. 1999), available at http://www.ietf.org/rfc/rfc2703.txt?number=2703, 19 pages.
Holtman et al.; "HTTP Remote Variant Selection Algorithm—RVSA/1.0," Network Working Group (Mar. 1998), available at http://www.ietf.org/rfc/rfc2296.txt?number=2296, 13 pages.
Holtman et al.; "Transparent Content Negotiation in HTTP," Network Working Group (Mar. 1998), available at http://www.ietf.org/rfc/rfc2295.txt?number=2295, 55 pages.
Background of the Invention for the above-captioned application (previously provided).
U.S. Appl. No. 12/242,916, filed Oct. 1, 2008, Kiefhaber et al.
U.S. Appl. No. 12/193,542, filed Aug. 18, 2008, Olson.
Sarda, "Temporal Issues in Data Warehouse Systems", 1999, Database Applications in Non-Traditional Environments (DANTE'99), S. 27, DOI: 10.1109/DANTE.1999.844938.
Karakasidis A. "Queues for Active Data Warehousing", Jun. 17, 2005, Baltimore, MA, in Proceedings on Information Quality in Informational Systems (IQIS'2005), S.28-39, ISBN: 1-59593-160-0, DOI: 10.1109/DANTE.1999.844938.
"Learn the structure of an Access database", available at http://office.microsoft.com/en-us/access/HA012139541033.aspx, site updated Nov. 13, 2007, pp. 1-4.
Dillion, "Renaming fields and tracing dependencies", available at http://allenbrowne.com/ser-41.html, Nov. 2003, updated May 2006, 1 page.
Thayer Watkins, "Cost Benefit Analysis", 1999, San Jose State University Economics Department, Web Archive http://web.arch ive.org/web/19990225143131/http://www.sjsu.edu/faculty/watkins/cba.htm.
U.S. Appl. No. 11/242,687, filed Oct. 3, 2005, Krimstock et al.
Ahmed, Sarah, "A Scalable Byzantine Fault Tolerant Secure Domain Name System," thesis submitted to Massachusetts Institute of Technology, Department of Electrical Engineering and Computer Science, Jan. 22, 2001, 101 pages.
Avaya, Inc. Business Advocate Options, at http://www.avaya.com, downloaded on Feb. 15, 2003, Avaya, Inc. 2003.
Avaya, Inc. Business Advocate Product Summary, at http://www.avaya.com, downloaded on Feb. 15, 2003, Avaya, Inc. 2003, 3 pages.
Avaya, Inc. CentreVu Advocate, Release 9, User Guide, Dec. 2000.
Avaya, Inc., "Better Implementation of IP in Large Networks," Avaya, Inc. 2002, 14 pages.
Avaya, Inc., "The Advantages of Load Balancing in the Multi-Call Center Enterprise," Avaya, Inc., 2002, 14 pages.
Avaya, Inc., "Voice Over IP Via Virtual Private Networks: An Overview," Avaya, Inc., Feb. 2001, 9 pages.
Bellsouth Corp., "Frequently Asked Questions—What is a registrar?," available at https://registration.bellsouth.net/NASApp/DNSWebUI/FAQ.jsp, downloaded Mar. 31, 2003, 4 pages.
Chavez, David, et al., "Avaya MultiVantage Software: Adapting Proven Call Processing for the Transition to Converged IP Networks," Avaya, Inc., Aug. 2002.
Coles, Scott, "A Guide for Ensuring Service Quality in IP Voice Networks," Avaya, Inc., 2002, pp. 1-17.
Dawson, "NPRI's Powerguide, Software Overview" Call Center Magazine (Jun. 1993), p. 85.
Doo-Hyun Kim et al. "Collaborative Multimedia Middleware Architecture and Advanced Internet Call Center," Proceedings at the International Conference on Information Networking (Jan. 31, 2001), pp. 246-250.
E. Noth et al., "Research Issues for the Next Generation Spoken": University of Erlangen-Nuremberg, Bavarian Research Centre for Knowledge-Based Systems, at http://www5.informatik.uni-erlangen.de/literature/psdir/1999/Noeth99:RIF.ps.gz, printed Feb. 10, 2003; 8 pages.
Foster, Robin, et al., "Avaya Business Advocate and its Relationship to Multi-Site Load Balancing Applications," Avaya, Inc., Mar. 2002, 14 pages.
Geotel Communications Corporation Web site printout entitled "Intelligent CallRouter" Optimizing the Interaction Between Customers and Answering Resources., 1998, 6 pages.
John H.L. Hansen and Levent M. Arsian, Foreign Accent Classification Using Source Generator Based Prosodic Features, IEEE Proc. ICASSP, vol. 1, pp. 836-839, Detroit USA (May 1995).
L.F. Lamel and J.L. Gauvain, Language Identification Using Phone-Based Acoustic Likelihood, ICASSP-94, date unknown; 4 pages.
Levent M. Arsian and John H.L. Hansen, Language Accent Classification in American English, Robust Speech Processing Laboratory, Duke University Department of Electrical Engineering, Durham, NC, Technical Report RSPL-96-7, revised Jan. 29, 1996. pp. 1-16.
Levent M. Arsian, Foreign Accent Classification in American English, Department of Electrical Computer Engineering, Duke University, Thesis, pp. 1-200 (1996).
MIT Project Oxygen, Pervasive, Human-Centered Computing (MIT Laboratory for Computer Science) (Jun. 2000) pp. 1-15.
Presentation by Victor Zue, The MIT Oxygen Project, MIT Laboratory for Computer Science (Apr. 25-26, 2000) 9 pages.
Stevenson et al.; "Name Resolution in Network and Systems Management Environments"; http://netman.cit.buffalo.edu/Doc/DStevenson/NR-NMSE.html; printed Mar. 31, 2003; 16 pages.
"Applications, NPRI's Predictive Dialing Package," Computer Technology (Fall 1993), p. 86.
"Call Center Software You Can't Outgrow," Telemarketing® (Jul. 1993), p. 105.
"Domain Name Services," available at http://www.pism.com/chapt09/chapt09.html, downloaded Mar. 31, 2003, 21 pages.

"eGain's Commerce 2000 Platform Sets New Standard for eCommerce Customer Communications," Business Wire (Nov. 15, 1999)., 3 pages.

"Internet Protocol Addressing," available at http://samspade.org/d/ipdns.html, downloaded Mar. 31, 2003, 9 pages.

"Product Features," Guide to Call Center Automation, Brock Control Systems, Inc., Activity Managers Series™, Section 5—Company B120, p. 59, 1992.

"Product Features," Guide to Call Center Automation, CRC Information Systems, Inc., Tel-ATHENA, Section 5—Company C520, p. 95, 1992.

"VAST™, Voicelink Application Software for Teleservicing®," System Manager User's Guide, Digital Systems (1994), pp. ii, vii-ix, 1-2, 2-41 through 2-77.

"When Talk Isn't Cheap," Sm@rt Reseller, v. 3, n. 13 (Apr. 3, 2000), p. 50.

Richard Shockey, "ENUM: Phone Numbers Meet the Net" www.cConvergence.com (Jul. 2001) pp. 21-30.

Bill Michael, "The Politics of Naming" www.cConvergence.com (Jul. 2001) pp. 31-35.

Sugano et al. ;"Common Presence and Instant Messaging (CPIM) Presence Information Data Format," Network Working Group (Dec. 2002), available at http://www.ietf.org/internet-drafts/draft-ietf-impp-cpim-pidf-07.txt, 26 pages.

Crocker et al.; "Common Presence and Instant Messaging (CPIM)," Network Working Group (Aug. 14, 2002), available at http://www.ietf.org/internet-drafts/draft-ietf-impp-cpim-03.txt, 33 pages.

Atkins et a.l; "Common Presence and Instant Messaging: Message Format," Network Working Group (Jan. 9, 2003), available at http://www.ietf.org/internet-drafts/draft-ietf-impp-cpim-msgfmt-08.txt, 31 pages.

Rose et al..; "The APEX Presence Service," Network Working Group (Jan. 14, 2002), available at http://www.ietf.org/internet-drafts/draft-ietf-apex-presence-06.txt, 31 pages.

Day et al.; "A Model for Presence and Instant Messaging," Network Working Group (Feb. 2000), available at http://www.ietf.org/rfc/rfc2778.txt?number=2778, 16 pages.

Day et al.; "Instant Messaging/Presence Protocol Requirements," Network Working Group (Feb. 2000), available at http://www.ietf.org/rfc/rfc2779.txt?number=2779, 25 pages.

Gulbrandsen et al.; "A DNS RR for Specifying the Location of Services (DNS SRV)," Network Working Group (Feb. 2000), available at http://www.ietf.org/rfc/rfc2782.txt?number=2782, 12 pages.

U.S. Appl. No. 10/683,039, filed Oct. 10, 2003, Flockhart et al.

U.S. Appl. No. 10/861,193, filed Jun. 3, 2004, Flockhart et al.

U.S. Appl. No. 10/946,638, filed Sep. 20, 2004, Flockhart et al.

U.S. Appl. No. 10/815,534, filed Mar. 31, 2004, Kiefhaber.

U.S. Appl. No. 10/815,566, filed Mar. 31, 2004, Kiefhaber.

U.S. Appl. No. 10/815,584, filed Mar. 31, 2004, Kiefhaber.

Fundamentals of Data Warehousing—Unit 3—Dimensional Modeling, Fundamentals of Data Warehousing, copyright 2005—Evolve Computer Solutions, 55 pages.

The Importance of Data Modeling as a Foundation for Business Insight, Larissa Moss and Steve Hoberman, copyright 2004, 38 pages.

CS 345: Topics in Data Warehousing, Oct. 5, 2004, 36 pages.

An Expert's Guide to Oracle Technology blog, My Personal Dictionary, Lewis R. Cunningham, posted Mar. 31, 2005, http://blogs.ittoolbox.com/oracle'guide/archives003684.asp, 4 pages.

Data Warehouse Designer Fact Tables and Dimension, Jan. 1, 2003, http://www.inteeigententerprise.com/030101/602warehouse1_1.jhtml, Ralph Kimball, 3 pages.

Glossary—Curlingstone Publishing, http://www.curlingstone.com/7002/7002glossary.html, downloaded May 24, 2005, 11 pages.

Data Warehouse—Surrogate Keys, Keep Control Over Record Identifiers by Generating New Keys for the Data Warehouse, Ralph Kimball, May 1998, 4 pages.

Data Warehouse Designer—An Engineer' s View—Its' Worthwhile to Remind Ourselves Why We Build Data Warehouses the Way We Do, Ralph Kimball, Jul. 26, 2002, 3 pages.

Data Warehouse Designer—Design Constraints and Unavoidable Realities, No design Problem in School was This Hard, Ralph Kimball, Sep. 3, 2002, 3 pages.

Data Warehouse Designer—Two Powerful Ideas, The Foundation for Modern Data Warehousing, Ralph Kimball, Sep. 17, 2002, 3 pages.

Data Warehouse Designer—Divide and Conquer, Build Your Data Warehouse One Piece at a Time, Ralph Kimball, Oct. 30, 2002, 3 pages.

Data Warehouse Designer—The Soul of the Data Warehouse, Part One: Drilling Down, Ralph Kimball, Mar. 20, 2003, 3 pages.

Data Warehouse Designer—The Soul of the Data Warehouse, Part Two: Drilling Across, Ralph Kimball, Apr. 5, 2003, 3 pages.

Data Warehouse Designer—The Soul of the Data Warehouse, Part Three: Handling Time, Ralph Kimball, Apr. 22, 2003, 3 pages.

Data Warehouse Designer—TCO Starts with the End User, Ralph Kimball, May 13, 2003, http://www.intelligententerprise.com/030513/608warehouse1_1.jhtml?_requestid=598425, 3 pages.

Creating and Using Data Warehouse—Using Dimensional Modeling (Microsoft) downloaded May 18, 2005 http://msdn.microsoft.com/library/en-us/createdw/createdw_39z.asp?frame=true 1 page.

DMReview—Business Dimensional Modeling: The Logical Next Step: Translating the BDM, Laura Reeves, published May 2004, 4 pages.

Multi-Dimensional Modeling with BW ASAP for BW Accelerator Business Information Warehouse, copyright 2000, 71 pages.

ComputerWorld, ETL, M. Songini, at http://www.computerworld.com/databasetopics/businessintelligence/datawarehouse/story/ . . . 5 pages.

Kimball, et al., "The Complete Guide to Dimensional Modeling." The Data Warehouse Toolkit. 2nd Edition, 2002. Ch. 11, pp. 240-241.

Kimball, et al., "Practical Techniques for Extracting, Cleaning, Conforming, and Delivering Data." The Data Warehouse ETL Toolkit. 2004. Ch. 5, pp. 170-174.

Snape, James, "Time Dimension and Time Zones." 2004. pp. 1-10. http://www.jamessnape.me.uk/blog/CommentView,gui,79e910a1-0150-4452-bda3-e98df.

Definity Communications System Generic 3 Call Vectoring-Expert Agent Selection (EAS) Guide, AT&T publication No. 555-230-520 (Issue 3, Nov. 1993).

D. Browning et al., "Data Warehouse Design Considerations", Microsoft SQL 2000 Technical Articles, Dec. 2001, 24 pages.

A.A. Vaisman et al., "A Temporal Query Language for OLAP: Implementation and a Case Study", 36 pages.

G. Wiederhold, "Mediation to Deal with Heterogeneous Data Sources", Stanford University, Jan. 1999, 19 pages.

J. Cahoon, "Fast Development of a Data Warehouse Using MOF, CWM and Code Generation", CubeModel, May 22, 2006, 32 pages.

J.E. Bentley, "Metadata: Everyone Talks About It, But What Is It?", First Union National Bank, 5 pages.

O. Boussaid et al., "Integration and dimensional modeling approaches for complex data warehousing", J. Global Optimization, vol. 37, No. 4, Apr. 2007, 2 pages.

L. Cabibbo et al., "An Architecture for Data Warehousing Supporting Data Independence and Interoperability", International Journal of Cooperative Information Systems, 41 pages.

Avaya IQ "Introducing Reporting and Analytics As You Designed It", 4 pages.

"Avaya IQ—Building Upon the Strengths of CMS", White Paper, Feb. 2007, 11 pages.

"Driving Model Agent Behaviors With Avaya IQ", White Paper, Apr. 2007, 12 pages.

E. Veerman, "Designing a Dimensional Model", 38 pages.

D. Smith, "Data Model Overview Modeling for the Enterprise While Serving the Individual", Teredata Global Sales Support, 33 pages.

"Dimensional database", Wikipedia, downloaded Aug. 30, 2007 (3 pages).

A.B. Schwarzkopf, "Dimensional Modeling for a Data Warehouse", 18 pages.

U.S. Appl. No. 12,789,038, filed May 27, 2010, Bland et al.

Akitsu, "An Introduction of Run Time Library for C Program, the fourth round," C Magazine, Jul. 1, 1990, vol. 2(7), pp. 78-83.

Emura, "Windows API Utilization Guide, Points for Knowledges and Technologies," C Magazine, Oct. 1, 2005, vol. 17(10), pp. 147-150.

Examiner's Office Letter (including translation) for Japanese Patent Application No. 2007-043414, mailed Jul. 7, 2010.

Blog from "Road warrior and telecommuter-Community for Avaya Users," from http://www.avayausers.com/showthread.php?p=13430, earliest post date Nov. 21, 2006, printed on Sep. 15, 2009, 4 pages.

Google Docs "IP Softphone for Windows Mobile 5" printed on Sep. 15, 2009 from http://docs.google.com/gview?a=v&q=cache:92VrteFXqm8J:support.avaya.com/css/P8/documents/100021136+Avaya+telecom..., 1 page.

Overview of Avaya IP Softphone printed on Sep. 15, 2009 from http://support.avaya.com/elmodocs2/ip_softphone/Overview_IP_Softphone_R6.htm, 2 pages.

Product Brief of "Avaya IP Agent" printed on Sep. 15, 2009 from http://docs.google.com/gview?a=v&q=cache:IRR32Pfzp98J:www.nacr.com/uploadedFiles/Products/Avaya%2520IP%2520Age..., 1 page.

Product Description of "Avaya one-X Agent," printed on Sep. 15, 2009 from http://www.avaya.com/usa/product/avaya-one-x-agent, 1 page.

Product Overview of "IP Softphone" printed on Sep. 15, 2009 from http://www.nacr.com/Products.aspx?id=236, 3 pages.

Venkatesan et al., "A Customer Lifetime Value Framework for Customer Selection and Resource Allocation Strategy," Journal of Marketing, Oct. 2004, vol. 68, pp. 106-125.

U.S. Appl. No. 11/956,779, filed Dec. 14, 2007, Burritt et al.

Hellstrom, et al., RFC-4103 Protocol, entitled "RTP Payload for Text Conversation," Network Working Group, http://www.rfc-editor.org/rfc/rfc4103.txt, Jun. 2005, 18 pages.

* cited by examiner

ACDAgent

| ACDAgentKey |
|---|
| DataSourceAgentID
PartyEID
PartyEIDRequestTime
Extension
ExtensionLocationID
AgentName1
AgentName2
CallHandlePreference
TerminationDate
TermincationReason
DirectAgentSkill
ServiceObjectiveInd
StaffedInd
UserID
DirectAgnetCallFirstInd
DeletionCandidatedInd
CallCenterKey (FK)
AdminItemID
PartyAccountEID
PartyAccountEIDReqstTime
Name
Type
Description
RowVersion
UpdateTime |

*Fig. 5*

DATABASE STRUCTURES AND ADMINISTRATION TECHNIQUES FOR GENERALIZED LOCALIZATION OF DATABASE ITEMS

FIELD OF THE INVENTION

The invention relates generally to database management and administration and particularly to data warehouse designs incorporating entity translations and/or conversions.

BACKGROUND OF THE INVENTION

Contact centers, such as Automatic Call Distribution or ACD systems, are employed by many enterprises to service customer contacts. A typical contact center includes a switch and/or server to receive and route incoming packet-switched and/or circuit-switched contacts and one or more resources, such as human agents and automated resources (e.g., Interactive Voice Response (IVR) units), to service the incoming contacts. Contact centers distribute contacts, whether inbound or outbound, for servicing to any suitable resource according to predefined criteria. In many existing systems, the criteria for servicing the contact from the moment that the contact center becomes aware of the contact until the contact is connected to an agent are customer-specifiable (i.e., programmable by the operator of the contact center), via a capability called vectoring. Normally in present-day ACDs when the ACD system's controller detects that an agent has become available to handle a contact, the controller identifies all predefined contact-handling skills of the agent (usually in some order of priority) and delivers to the agent the highest-priority oldest contact that matches the agent's highest-priority skill. Generally, the only condition that results in a contact not being delivered to an available agent is that there are no contacts waiting to be handled.

The primary objective of contact center management, including call-distribution algorithms, is to ultimately maximize contact center performance and profitability. An ongoing challenge in contact center administration is monitoring of selected data entities associated with contact center operation to optimize the use of contact center resources and maximize agent performance and profitably. Current products for monitoring and reporting on contact center performance, such as Call Management System or CMS™ and Avaya IQ by Avaya, Inc., are configured as data warehouses that extract data from multiple sources, transform the data into a normalized form, and load the data into the data warehouse database, typically on a real time basis.

A common type of data warehouse is based on dimensional modeling. Dimensional modeling is a data model that divides the world into measurements and context. Measurements are usually numeric and taken repeatedly. Numeric measurements are facts. Facts are surrounded by textual context in existence when the fact is recorded. Context is often subdivided into dimensions. Fact tables are used in dimensional modeling to logically model measurements with multiple foreign keys referring to the contextual entities. The contextual entities each have an associated primary key. A "key" is a data element (e.g., attribute or column) that identifies an instance of an entity or record in a collection of data, such as a table. A "primary key" is a column or combination of columns whose values uniquely identify a row in a table or is the attribute or group of attributes selected from the candidate keys as the most suitable to uniquely identify each instance of an entity. A "foreign key" refers to a column or combination of columns whose values are required to match a primary key in another table or is a primary key of a parent entity that contributes to a child entity across a relationship. Types of primary keys include a natural key, or a key having a meaning to users, and a surrogate key, or a key that is artificially or synthetically established, meaningless to users, and used as a substitute for a natural key.

If the same entity (e.g., agent) is represented on multiple data sources (e.g., inbound call system and outbound call system) by different natural keys, a traditional data warehouse generates and assigns a surrogate key to identify the entity. The surrogate key is an internal identifier managed by the data warehouse. For example, in a contact center an agent may handle inbound calls from one system and outbound calls from another system, with different identities on each system. Data warehouses commonly process each data source independently, performing data correlation across sources at a later time.

Some data models specify a behavior known as a type 2 slowly changing dimension. A type 2 dimension tracks the history of changes to an entity over time. When an attribute of an entity is changed, such as when a contact center agent changes their skill set or group membership, a new surrogate key for that entity is generated, and a new row inserted into the database. Fact data associated with the entity can now be tracked separately for activities that occurred before versus after the change by referencing the appropriate surrogate key.

An ongoing issue confronting vendors of contact center software products is translation or conversion of selected data entities to parallel expressions. For example, contact center users and administrators desire to have data displayed in a human language of the user's choice. By way of illustration, a queue may be named the "gold" queue in English and the "oro" queue in Spanish. In administering translations and conversions, it is desirable to provide an interface that can easily update translations or conversions, add new translations or conversions, add new database items or entities, and distinguish between changes to an underlying item and changes to the translation or conversion of that item.

Current practice addresses these needs by creating additional tables attached to each column requiring translation or conversion or creating additional columns in each table. The former practice is effected using identifiers pointing from one language version to a table containing another language version. The latter practice is effected by adding separate columns or "resource bundles" for each language employed. In either case when a language is added, new database structures are created, thereby requiring release of a new software application.

SUMMARY OF THE INVENTION

These and other needs are addressed by the various embodiments and configurations of the present invention. The present invention is directed to a data model for effecting transformations of entities from a first form of expression to a second different form of expression.

In one embodiment, a method is provided that includes the steps:

(a) receiving an event notification;

(b) in response, creating and/or updating a first set of tables;

(c) in response and when an entity involved in step (b) and/or an attribute of the entity is potentially subject to a plurality of differing forms of expression, creating, in a set of localization tables separate from the first set of tables, a plurality of rows corresponding to some of the differing forms of expression, the set of localization tables comprising a plurality of differing forms of expression for each of a plurality of different entities and/or attributes thereof; and (d) including differing forms of expressions for the entity in differing ones of the plurality of rows.

In one implementation of this method, the set of localization tables include a display name category table, a display name group table, an administration item table, an administration locale table, a locale administration item table, and a language locale assignment table. The display name category and group tables can describe a table in the first set of tables and one of its columns by category and group, respectively. The administration item table associates entities and/or attributes thereof with corresponding categories and groups. The administration locale table maps geographical identifiers to corresponding types of expression. The locale administration item table associates entities and/or attributes thereof with differing forms of expression. The language locale assignment table maps geographical identifiers to types of expression to be used for display purposes.

In another embodiment, a method is provided that includes the steps:

(a) receiving a request for data entities, one or more of the data entities and/or an attribute of the entities having a plurality of differing forms of expression;

(b) using a first set of tables to identify an object corresponding to the selected data entity;

(c) using a second set of tables and the identified object to determine a type of expression to be used for the selected data entity and/or attribute of the entity; and (d) selecting a value for the selected data entity and/or attribute of the entity related to the determined type of expression.

The various embodiments can allow translations for new database columns without changing the structure. The database columns can be identified by a group and category. New languages can be added without additional structures. The new language and the accompanying translations of the data base columns in that language are additional values as opposed to new columns in the database.

Multiple locales can be mapped to specified translations. This feature allows administrators to select which translations will be presented based on the location of user. For example, a person located in Montreal, Quebec, might be presented with French (France) translations if Canadian French translations are unavailable. This can be changed simply by changes to data without change to the database and underlying processes.

A base language version is stored as a dimension and can be used to manage the history of changes to data items. The base language allows users to distinguish between actual changes to the item name and changes to a translation. The data structures preferably effectively separate changes to translations from changes that require a new row in the base table (a Type 2 change). This can be important for distinguishing between Type 1 and Type 2 changes in a dimensional model. A base language version (e.g., name and description) identifies the object and is separate from translated representations of that version. For example, the underlying object might be a queue named "Gold" in the source system. This might be translated incorrectly to "Oros" in Spanish. The translation could change to "Oro" with no effect on the history of the name of the object. However, if the source system changed the name to "Silver", the change would be recognized as a fundamental change in the name, and a history could be maintained, if desired.

Distinguishing between changes to the base version and translations can allow application developers to use the base version values in code for searches and grouping without accounting for translations and changes due to edits. In other words, the base version, and not an identifier, is used as an index in the localization tables. Report developers can thus rely on consistent values for grouping and calculations. Finally, users can change the display value of an item without impacting underlying processes and report results.

The solution can allow customers to report on data based on time. This means that the "definition" (base version) at the time relative to the report will be used instead of just the current value. For example, an "aux" state code #3 changes from meaning "break" to "team meeting" on July $1^{st}$. Data related to May $1^{st}$ reflects the old version (definition). A report on August $1^{st}$ will reflect the new definition. If one reports from June $28^{th}$ through July $3^{rd}$ then both definitions will be reflected in the report as separate entities. The change to the base version (meaning) will be supported as a Type 2 change, causing the above-noted behavior. However, a user may change a single translation for improved meaning, without wanting to change the underlying meaning of all translations regarding the object. In this case, the new value would be displayed without relation to time.

The data structures can accept translations for any column in the database in the same structures and allow static strings to be used reliably for grouping and sorting of data, independent of translations. Results can be consistent between multiple languages. Changing translations will not impact results. This is because grouping and sorting operations can be done on the base language.

Finally, the data structures can present the selected language to the user based on the user locale. Many locales map to the same language.

The solution is similar in some aspects to the use of generic "name-value pairs" in that it employs meta data to allow the addition of values in real time without additions to the underlying data base. However, the solution is different in that the administration and localization structures allow the activity to occur independently of the underlying meaning of the object as it relates to measures and calculations. This means that localized values can be added and administered without using Structure Query Language (SQL) that is normally needed to produce measures in reports. The solution is also different in that "name-value pairs" containers require either a Type 1 or 2 approach, such that the impact on history cannot be distinguished for individual items.

The present invention can provide a number of other advantages depending on the particular configuration. For example, the invention can address effectively and with relatively low additional storage requirements the capabilities required to administer translations and conversions. These capabilities include updating translations and conversions, adding new translations and conversions, adding new languages, adding new database items, and distinguishing between changes to the underlying item and changes to translations and conversions. These capabilities can be met without changing the database structure, which supports the computer application. A new language requires only the administration of new values through the user interface, as opposed to a new release of software. The use of a base language along with a generic data structure allowing the administered item to identify the target table and column in the reporting database can provide flexibility to handle as many languages and translations as required through administration as opposed to new database structures or software code. It can provide developers and users with a reliable base meaning and representation for objects and the flexibility to adjust the displayed translations without impacting underlying functionality. Localization can thus be done dynamically and in real time without vendor interaction. New values can be added and localized through a dynamic administration interface in real time as opposed to a static process (e.g., resource bundles). No patching or upgrading is normally required to add additional language or translations. The process can be extended to support custom tables. Custom data can be added and localized through the localization administration process. New values, such as agent states, can be added and localized through table changes with no code changes required.

These and other advantages will be apparent from the disclosure of the invention(s) contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "form of expression" refers to an instantiation of a type of expression or transformation. For example, a first form of expression is "gold", and a second is "oro".

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The term "transformation" as used herein refers to a translation, conversion, or change of information, such as a value, a character, a symbol, a variable, a parameter, and the like, from one form of expression or format to another form of expression or format.

The terms "type of expression" and "type of transformation" refer to a set of semantical, lexical, syntactical, morphological, and/or grammatical rules. For example, English is a first type of expression or transformation while French is a second type of expression or transformation.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

BRIEF DESCRIPTION OF THE DRAWINGS

FIG. 5 is a data table according to an embodiment of the present invention;

DETAILED DESCRIPTION

The Contact Center Architecture

Figure 1:
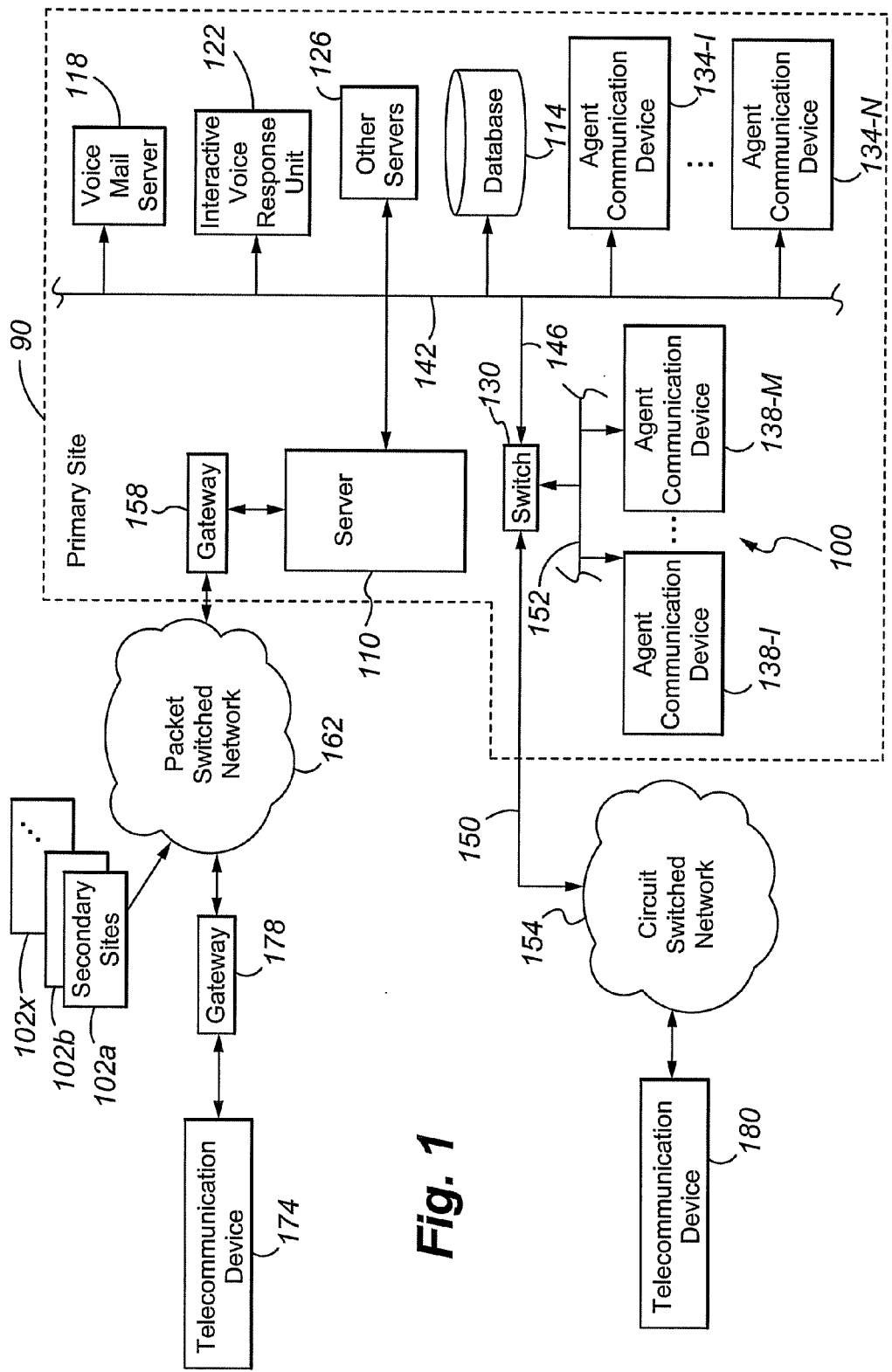
FIG. 1 is a block diagram of a contact center according to an embodiment of the present invention.

FIG. 1 shows an illustrative embodiment of the present invention. A primary site 90 of a global contact center 100 comprises a central server 110, a set of data stores or databases 114 containing contact or customer related information, agent information, and other contact center information that can enhance the value and efficiency of the contact center operation, and a plurality of servers, namely a voice mail server 118, an Interactive Voice Response unit or IVR 122, and other servers 126 (such as a predictive dialer), a switch 130, a plurality of working agents operating packet-switched (first) telecommunication devices 134-1 to N (such as computer work stations or personal computers), and/or circuit-switched (second) telecommunication devices 138-1 to M, all interconnected by a local area network LAN (or wide area network WAN) 142. The servers can be connected via optional communication lines 146 to the switch 130. As will be appreciated, the other servers 126 can also include a scanner (which is normally not connected to the switch 130 or Web server), VoIP software, video call software, voice messaging software, an IP voice server, a fax server, a web server, and an email server and the like. The switch 130 is connected via a plurality of trunks 150 to the Public Switched Telecommunication Network or PSTN 154 and via link(s) 152 to the second telecommunication devices 138-1 to M. A gateway 158 is positioned between the server 110 and the packet-switched network 162 to process communications passing between the server 110 and the network 162.

The term "switch" or "server" as used herein should be understood to include a PBX, an ACD, an enterprise switch, or other type of telecommunications system switch or server, as well as other types of processor-based communication control devices such as media servers, computers, adjuncts, etc.

The switch 130 and/or server 110 can be any architecture for directing contacts to one or more telecommunication devices. Illustratively, the switch and/or server can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ Private-Branch Exchange (PBX)-based ACD system; Multi-Vantage™ PBX, CRM Central 2000 Server™, Communication Manager™, S8300™, S8400™, S8500™, or S87XX media server, and/or Avaya Interaction Center™. Typically, the switch/server is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. The switch and/or server typically include a network interface card (not shown) to provide services to the serviced telecommunication devices. Other types of known switches and servers are well known in the art and therefore not described in detail herein.

The gateway 158 can be any suitable device for converting protocols, such as Avaya Inc.'s, G250™, G350™, G600™, G650™, or G700™ Media Gateway, and may be implemented as hardware such as via an adjunct processor (as shown) or as a chip in the server.

The first telecommunication devices 134-1, . . . 134-N are packet-switched and can include, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, and any other communication device.

The second telecommunication devices 138-1, . . . 138-M are circuit-switched and can include, for example, wired and wireless telephones, PDAs, H.320 video phones and conferencing units, voice messaging and response units, traditional computer telephony adjuncts, and any other communication device.

It should be noted that the invention does not require any particular type of information transport medium between switch or server and first and second telecommunication devices, i.e., the invention may be implemented with any desired type of transport medium as well as combinations of different types of transport channels.

Secondary contact center sites 102a-x are located in geographically disparate locations. Each secondary contact center site 102 commonly includes multiple agents and agent communication devices 134-1 . . . N and 138-1 . . . M, a server 110 and media gateway 158.

The packet-switched network 162 can be any data and/or distributed processing network. In a typically implementation, the network 162 is a public or untrusted Wide Area Network, such as the Internet.

The packet-switched network 162 is in communication with an external first telecommunication device 174 via a gateway 178, and the circuit-switched network 154 with an external second telecommunication device 180.

Data from each of the secondary sites 102a-x is normally maintained in a central database 114 at the primary site 90. Data structures maintained in the database 114 are described in more detail in copending U.S. application Ser. No. 10/861, 193, filed Jun. 3, 2004, entitled "Data Model of Participation in Multi-Channel and Multi-Party Contacts", to Kiefhaber, et al., which is fully incorporated herein by this reference. Examples of attributes describing a customer contact with the contact center include contact identifier, contact type, outbound contact initiation method, customer identifier, data source identifier, party identifier, business role code, party role start timestamp, contact direction code, contact direction description, state identifier, trunk identifier, telephone address, contact participation group, contact part purpose, contact part related reason, contact media type, contact disposition, contact routing method, contact wait treatment, contact qualifier, dialed number purpose, routing construct, and state reason. Other data structures describe attributes of data entities other than contact-related items, such as queues and contact center resources, particularly human agents.

It should be emphasized that the configuration of the switch, server, user telecommunication devices, and other elements as shown in FIG. 1 is for purposes of illustration only and should not be construed as limiting the invention to any particular arrangement of elements.

Figure 2:
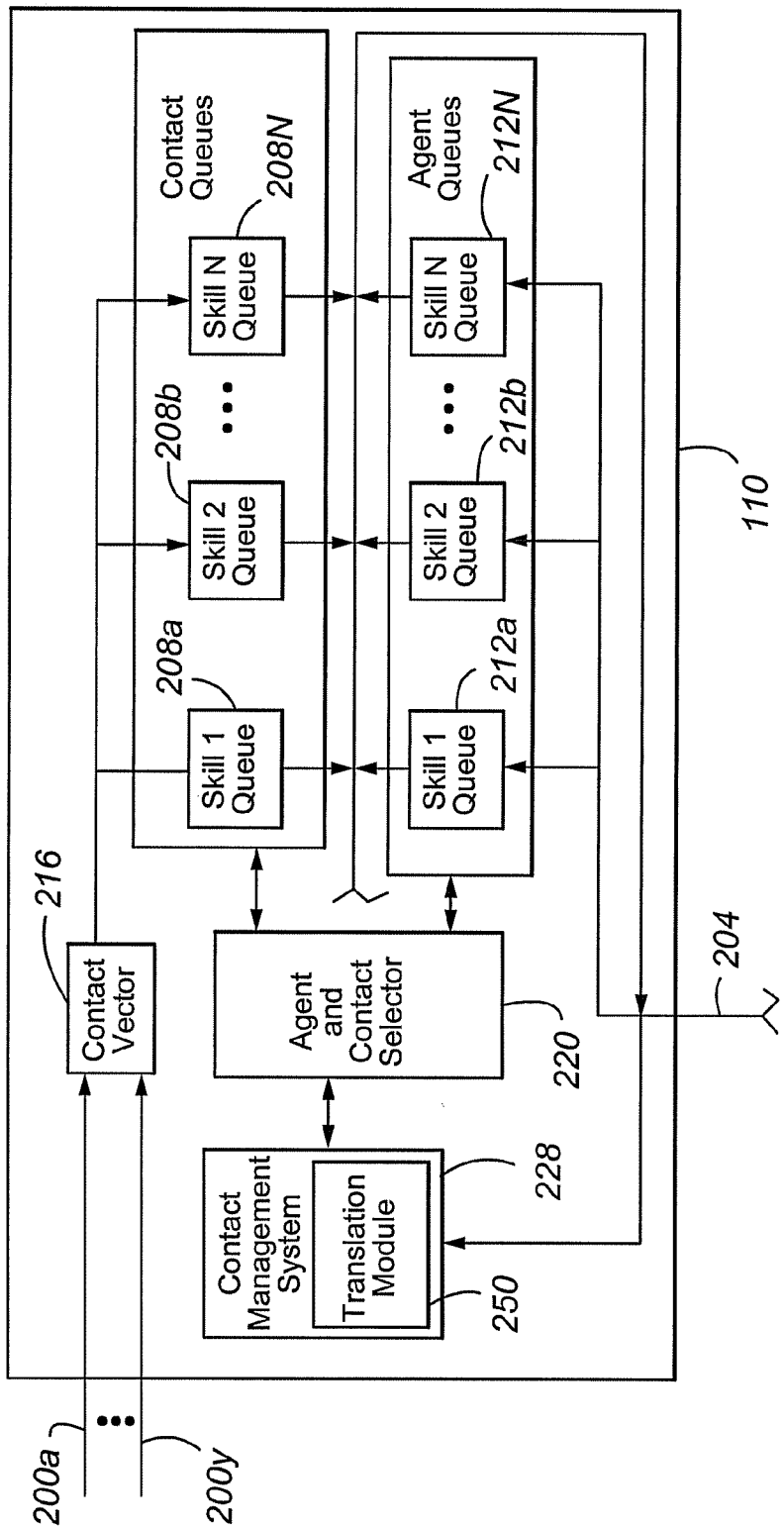
FIG. 2 is a block diagram of a server according to an embodiment of the present invention.

Referring to FIG. 2, one possible configuration of the server 110 is depicted. The server 110 is in communication with a plurality of customer communication lines 200a-y (which can be one or more trunks, phone lines, etc.) and agent communication line 204 (which can be a voice-and-data transmission line such as LAN 142 and/or a circuit switched voice line 140). The server 110 can include an event processing module 228, such as a modified form of Basic Call Management System™ or BCMS, Call Management System™, Operational Analyst™, and/or Avaya IQ by Avaya, Inc., that gathers call records and contact-center statistics for use in generating contact-center reports.

Included among the data stored in the server 110 is a set of contact queues 208a-n and a separate set of agent queues 212a-n. Each contact queue 208a-n corresponds to a different set of agent skills, as does each agent queue 212a-n. Conventionally, contacts are prioritized and either are enqueued in individual ones of the contact queues 208a-n in their order of priority or are enqueued in different ones of a plurality of contact queues that correspond to a different priority. Likewise, each agent's skills are prioritized according to his or her level of expertise in that skill, and either agents are enqueued in individual ones of agent queues 212a-n in their order of expertise level or are enqueued in different ones of a plurality of agent queues 212a-n that correspond to a skill and each one of which corresponds to a different expertise level. Included among the control programs in the server 110 is a contact vector 216. Contacts incoming to the contact center are assigned by contact vector 216 to different contact queues 208a-n based upon a number of predetermined criteria, including customer identity, customer needs, contact center needs, current contact center queue lengths, customer value, and the agent skill that is required for the proper handling of the contact. Agents who are available for handling contacts are assigned to agent queues 212a-n based upon the skills that they possess. An agent may have multiple skills, and hence may be assigned to multiple agent queues 212a-n simultaneously. Furthermore, an agent may have different levels of skill expertise (e.g., skill levels 1-N in one configuration or merely primary skills and secondary skills in another configuration), and hence may be assigned to different agent queues 212a-n at different expertise levels. Call vectoring is described in DEFINITY Communications System Generic 3 Call Vectoring/Expert Agent Selection (EAS) Guide, AT&T publication no. 555-230-520 (Issue 3, November 1993). Skills-based ACD is described in further detail in U.S. Pat. Nos. 6,173,053 and 5,206,903.

The contact management system 228 collects detailed information on incoming and/or outgoing contacts in the contact center and is stored either in the main memory or in a peripheral memory (e.g., disk, CD ROM, etc.) or some other computer-readable medium of the center 100. The system 228 includes a translation module 250 that handles translation and/or conversion of data entities or items from a first expression to a second expression. For example, the module 250 creates mapping data structures and maps items from one human language to another human language. The module 250 can effect generic administration of localization by providing the ability to translate new database columns, without additions to database tables and/or columns, by identifying a group and category for a selected item to be translated. It can also provide the ability to add new languages without adding new database tables or columns. The new language and accompanying translations of the database columns in that language are additional values as opposed to new columns in the database. It can also allow multiple locales to be mapped to specified translations, particularly using the geographical location of the user. For example, a first user in Montreal, Quebec might be given a French translation of a data item while a second user in Calgary, Alberta might be given an English translation of the same data item.

The Data Models

The data models used by the translation module 250 will be discussed with reference to FIGS. 3 and 4. These Figures show one-to-one and one-to-many relationships among various data entities and their respective attributes. As will be appreciated, interconnecting dashed lines indicate the related entities and the type of relationship.

Figure 3:
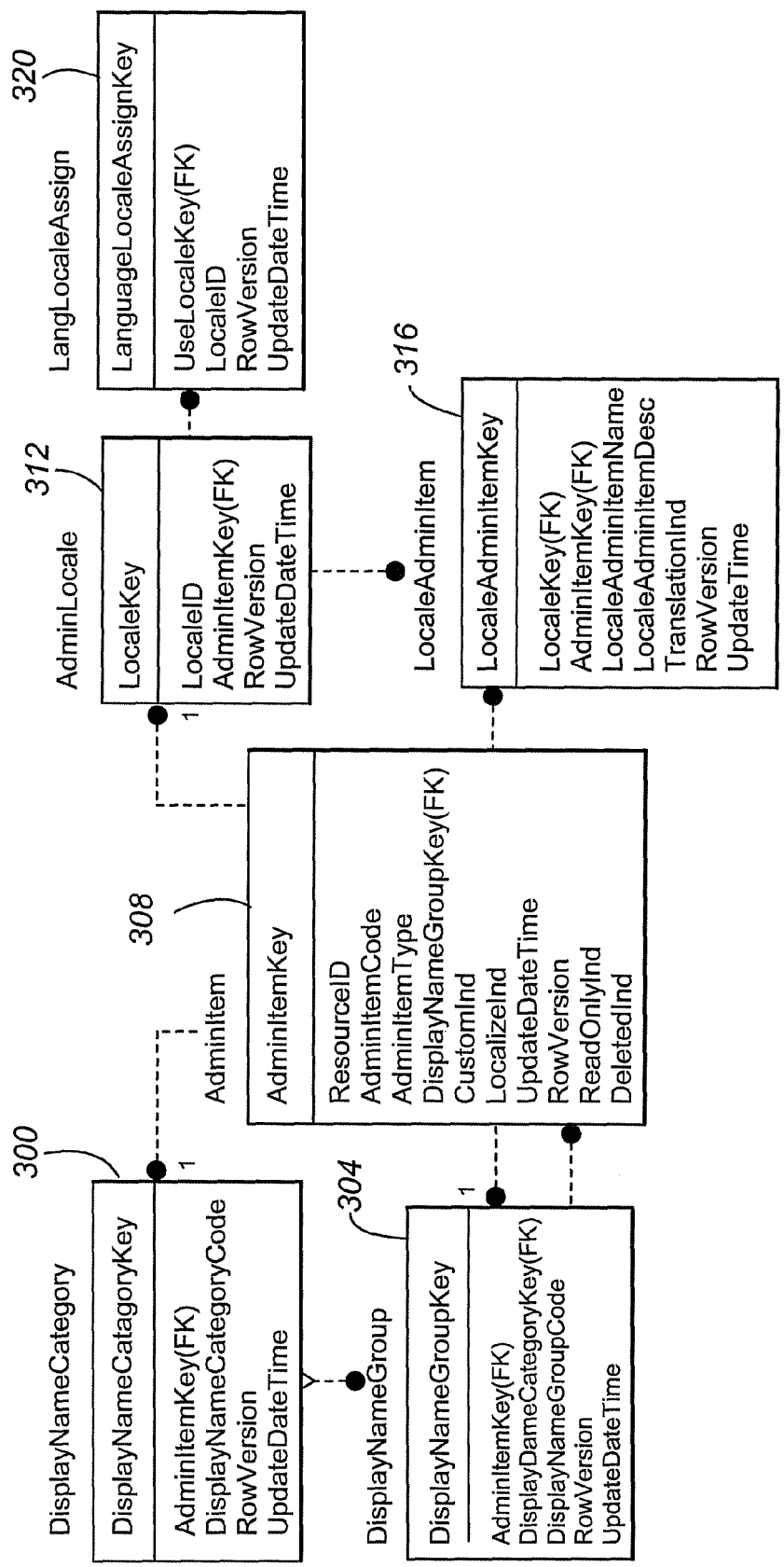
FIG. 3 is a normal form data model according to an embodiment of the present invention.

Referring to FIG. 3, the data model includes a number of inter-related tables, namely the DisplayNameCategory table 300, the DisplayNameGroup table 304, the AdminItem table 308, the AdminLocale table 312, the LocaleAdminItem table 316, and the LangLocaleAssign table 320. In these tables, AdminItem is an object of administration. AdminLocale is a geographic area, generally defined by political boundaries and is maintained for the purpose of defining the language of the area. DisplayNameCategory is an identifier of a high level grouping of administered objects, such as agent, device, queue, general, and the like and can map to a specified table. DisplayNameGroup, when compared to DisplayNameCategory, refers to a more specific class of administered objects and can be as specific as information that maps to a column in the specified table. Examples include logout reasons, results, agent activity states, contact direction, and the like. LanguageLocaleAssign is the assignment of the display language for specific combinations of data items and locale and shows the language to use for items based on locale, e.g., use en_US (US English) for queue name for nl_BE (Belgium).

The DisplayNameCategory table 300 includes DisplayNameCategoryKey, as the primary key, and, for each DisplayNameCategoryKey, includes AdminItemKey (which is a foreign key), DisplayNameCategoryCode, RowVersion, and UpdateDateTime. DisplayNameCategoryKey is a system-generated, unique key for a DisplayNameCategory. DisplayNameCategoryCode is a value of DisplayNameCategory. AdminItemKey is a system-generated, unique key for an AdminItem. RowVersion and UpdateDateTime refer, respectively, to the version of the row (each time the instance of this object is updated, it is incremented by one) and to the timestamp when the version of the entity instance was last changed.

The DisplayNameGroup table 304 includes DisplayNameGroupKey, as the primary key, and, for each DisplayNameGroupKey, includes AdminItemKey (which is a foreign key), DisplayNameCategoryKey (which is also a foreign key), DisplayNameGroupCode, RowVersion, and UpdateDateTime. DisplayNameGroupCode is an identifier to hierarchically reference a particular display name. A display name is typically identified by a combination of category and group. DisplayNameGroupKey is a system-generated, unique key for a display name group range.

The AdminItem table 308 includes AdminItemKey, as the primary key, and, for each AdminItemKey, Resource ID, AdminItemCode, AdminItemType, DisplayNameGroupKey (which is a foreign key), CustomInd, LocalizeInd, UpdateDateTime, RowVersion, ReadOnlyInd, and DeletedInd. AdminItemKey is a system-generated, unique key for an AdminItem. ResourceID is an identifier assigned each resource when it is administered. AdminItemCode is a unique value for AdminItem and is typically a native identifier received from a source. AdminItemType is a type of AdminItem (e.g., agent, queue, contact delivery, etc.) CustomInd is a yes/no indicator showing whether or not an AdminItem is customizable. DeletedInd is a yes/no indicator showing whether or not the object has been deleted from the source system. In a normal implementation, each AdminItem would have separate entries or rows in the AdminItem table.

The AdminItem table 308 bridges resource types (e.g., ACD agents, Vector Directory Numbers (VDNs)/routing points, queues/skills, routing process/vectors, reporting strings, etc.) with localized names and descriptions. There is, for example, a row in the table 308 for every instance of an ACD agent, VDN/routing point, queue/skill, static value, etc., having a localized name and description.

The AdminLocale table 312 includes LocalKey, as the primary key, and, for each LocalKey, a LocaleID, AdminItemKey (which is a foreign key), a RowVersion, and UpdateDateTime. The LocaleKey is a system-generated, unique key for a locale. LocaleID is a text ID for the locale, e.g., en_US for English (United States), es_CO for Spanish (Colombian), etc.

The LocaleAdmin item table 316 includes the LocaleAdminItemKey, as the primary key, and, for each LocaleAdminItemKey, a LocaleKey (which is a foreign key), AdminItemKey (which is also a foreign key), LocaleAdminItemName, LocaleAdminItemDesc, TranslationInd, RowVersion, and UpdateDateTime. LocaleAdminItemKey and Locale Key are a system-generated, unique key for a local Admin Item assignment and locale, respectively. The AdminItemKey is, of course, the AdminItemKey of the AdminItem for the resource being localized. The LocaleAdminItemName is the text name of the AdminItem in the language appropriate for the locale. LocaleAdminItemDesc is the text description of the AdminItem in the language appropriate for the locale. TranslationIND is a yes/no indicator showing whether or not the data item was localized or was populated with a default value.

The LangLocaleAssign table 320 includes LanguageLocaleAssignKey, as the primary key, and, for each LanguegeLocaleAssignKey, a UseLocaleKey (which is a foreign key), a LocaleID, a RowVersion, and UpdateDateTime. The LanguageLocaleAssignKey is a system-generated, unique key for a language locale assignment. The UseLocaleKey is a system-generated, unique key for a locale. It reflects a combination of language and locale, or the language to be applied to the actual locale. LocaleID is the text ID for the locale, such as en_US for English (United States) and es_CO for Spanish (Colombian).

With the above tables in mind, a number of observations can be made. Each instance of object (Gold Queue, User Smith) has a corresponding AdminItem. Each AdminItem is in a DisplayNameCategory and DisplayNameGroup so that it can be identified for display, data movement and by reports. By way of example, DisplayNameCategory is RoutingConstruct, and DisplayNameGroup is Queue. Each AdminItem has a base, or default (untranslated and unconverted) value. This is the original version of the item as received from the source. The base value is used to identify the item for localization, e.g., QueueName=Gold. The localization tables 300-316 map the user's locale to the display language, e.g., Display=es_CO (Colombian Spanish) and Locale=es_SP (Spain Spanish). The base value is populated for each object, e.g., Queue=Gold. The user administers localization for each desired language, e.g., Base value=Gold and Local value for es_CO=Oro.

Figure 4:
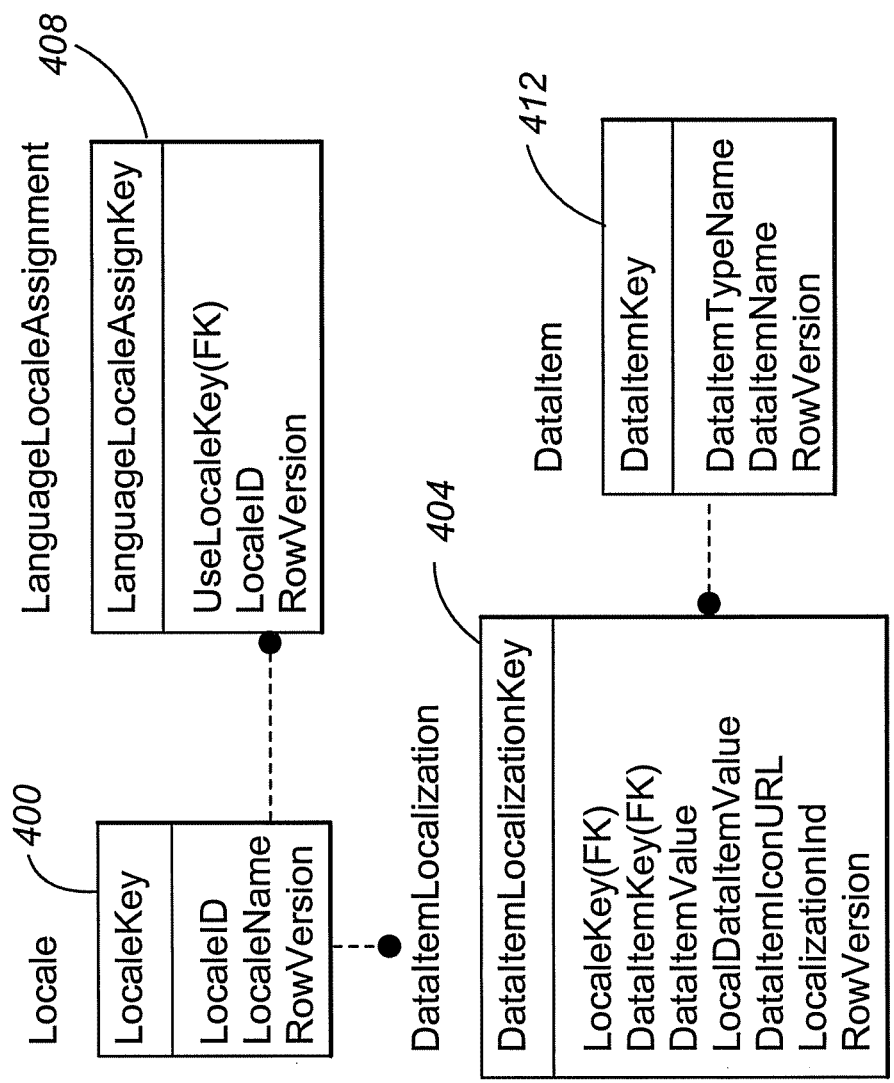
FIG. 4 is a normal form data model according to an embodiment of the present invention.
Figure 6:
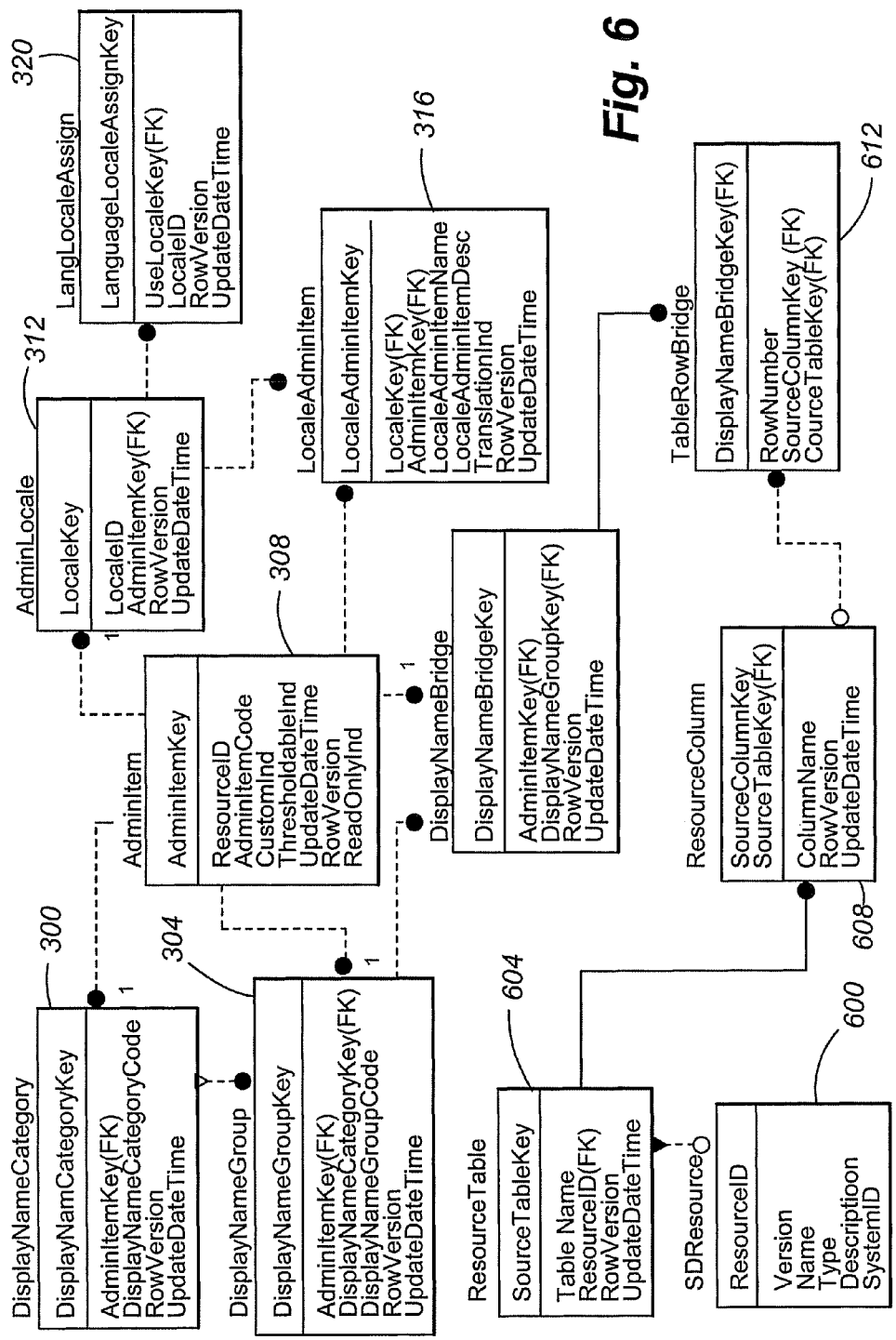
FIG. 6 is a normal form data model according to an embodiment of the present invention.
Figure 7:
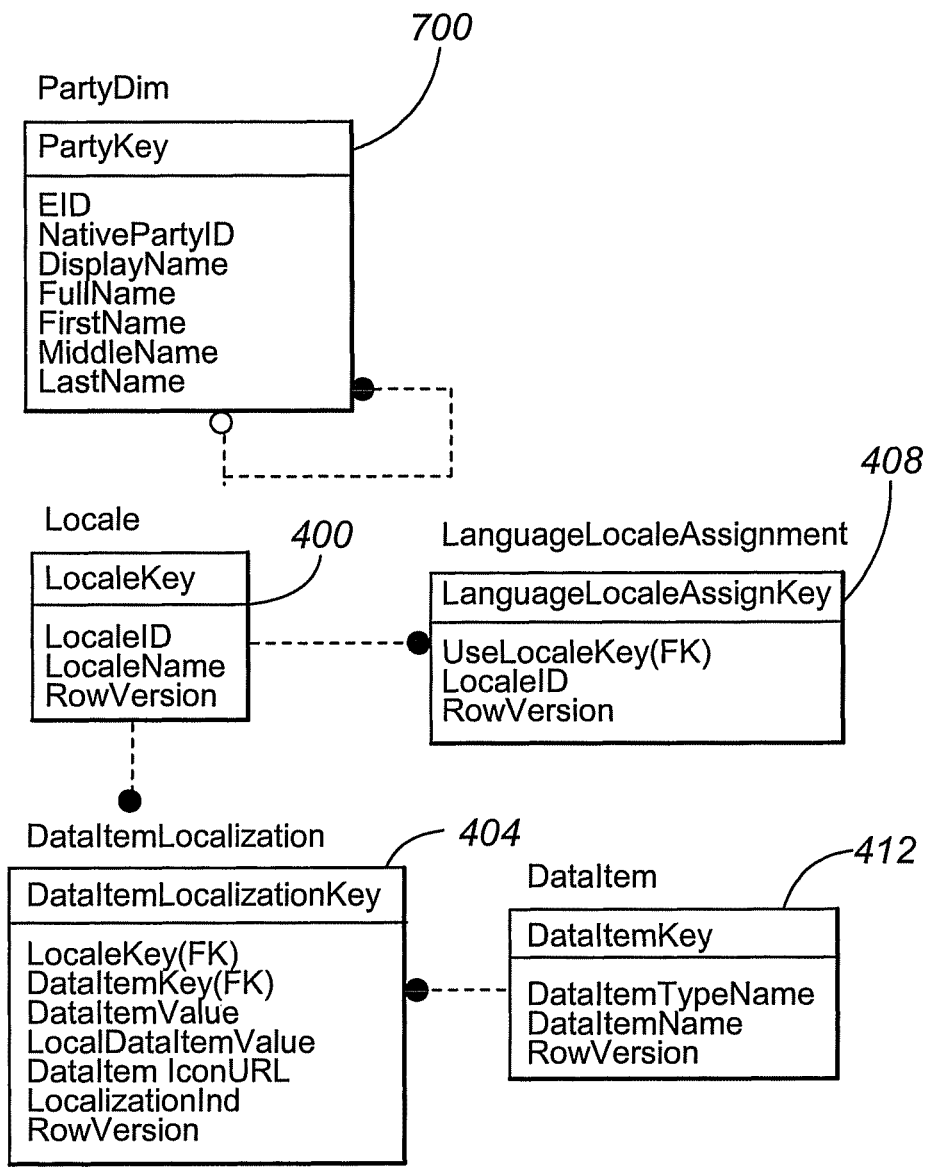
FIG. 7 is a normal form data model according to an embodiment of the present invention.
Figure 8:
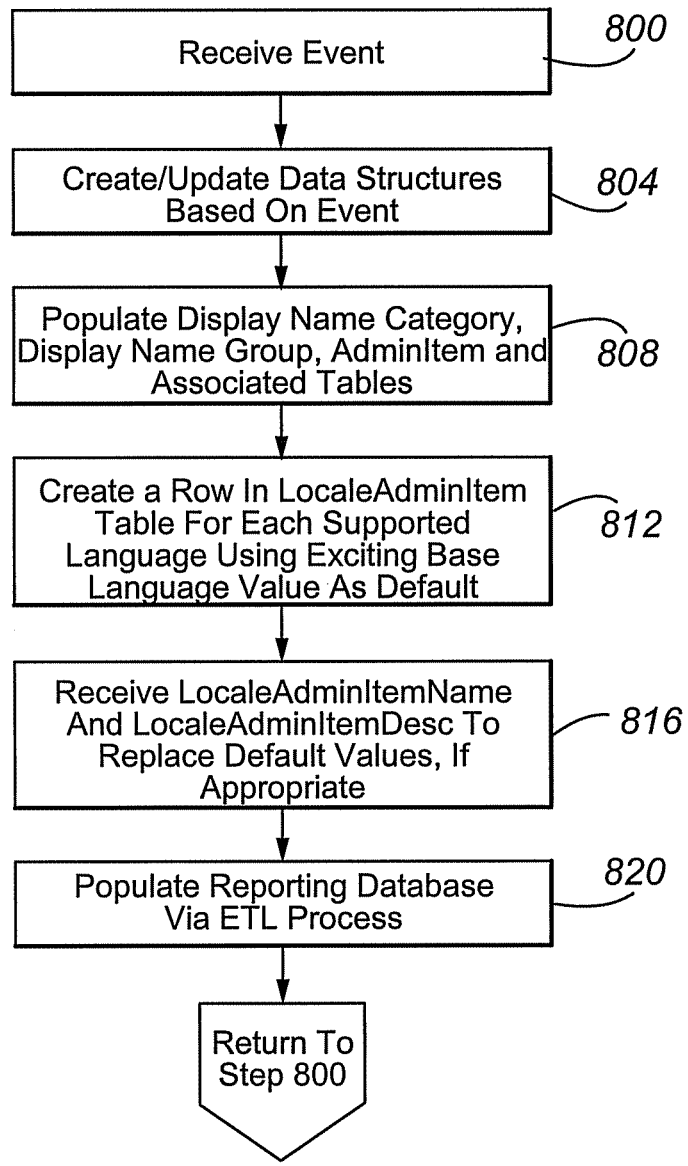
FIG. 8 is a flow chart according to an embodiment of the present invention.

FIG. 4 depicts dimensional reporting model localization data structures. The localization structures include a Locale table 400, a DataItemLocalization table 404, a LanguageLocaleAssignment table 408, and a DataItem table 412. In these tables, DataItem is the object to which localization is to be applied, e.g., state, queue name, etc. DataItemLocalization is the localized translations of DataItems for locales and is used to provide a localized version of the DataItem for display, e.g., the translation of the queue name "sales" into "verkauft" for the locale de_DE (German (Germany)). LanguageLocaleAssignment is the assignment of the display language for specific combinations of DataItems and locales. This shows the language to use for items based on locale, e.g., use en_US for queue name for nl_BE (the queue name will be displayed in English (US) if the locale is Dutch (Belgium)). Locale is the geographic area, generally defined by political boundaries, and is maintained for the purpose of defining the language of the area.

The Locale table 400 includes LocaleKey, as the primary key, and, for each LocaleKey, a LocaleID, LocaleName, and RowVersion. The LocaleKey is a system-generated, unique key for a locale. LocaleID is a text identifier for the locale, e.g., en_US for English (United States).

The DataItemLocalization table 404 includes DataItemLocalizationKey, as the primary key, and, for each DataItemLocalizationKey, a LocaleKey, a DataItemKey, a DataItemValue, a LocalDataItemValue, a DataItemIconURL, a LocalizationInd, and RowVersion. DataItemLocalizationKey and DataItemKey are system-generated, unique keys for DataItemLocalization and a DataItem to be localized, respectively.

DataItemValue is the value of the translated string. DataItemIconURL is the Universal Resource Locator (URL), or web address, of an icon used to represent the value of the DataItem, and LocalizationInd is a yes/no indicator showing whether or not the DataItemValue was localized or was populated with a default or base value.

The LanguageLocaleAssignment table 408 includes LanguageLocaleAssignKey, as the primary key, and for each LanguageLocaleAssignKey, a UseLocaleKey (which is a foreign key), a LocaleID, and RowVersion. The LanguageLocaleAssignKey and UseLocaleKey are system-generated, unique keys for a language locale assignment and locale, respectively.

Finally, the DataItem table 412 includes DataItemKey, as the primary key, and, for each DataItemKey, DataItemTypeName, DataItemName, and RowVersion. DataItemTypeName is the text name of the type of DataItem; that is, an instance of a query subject table, or other object, e.g., agent. DataItemName is the text name of the data item or the specific instance of the item, e.g., agent 1, queue 1, etc.

With the tables of FIG. 4 in mind, a number of observations can be made. The base values are stored in dimensions. An example refers to a dimension "RoutingConstructDim" as follows:
RoutingConstructDim.RoutingConstructName=Gold. The localized values are stored in localization tables. As an example:

Display name type="Routing Construct"
Display name="Queue"
Use locale="Colombian Spanish"
Data item value="Gold"
Local Data Item Value="Oro"

The localized display name is accessed from DataItemLocalization tables via views. As will be appreciated, data is stored in one location and a "view" is used to present to the end users a portion or derivation of the underlying data for the user's purposes. By way of example, assume that one of the secondary sites 102 is in South America and a user at that site seeks data regarding a queue having a default name or base value of "gold". The view selects on the data item type (RoutingConstructs), and data item name (Queue) to find the object. The view then selects on the data item value (Gold) to find the appropriate instance. Finally, the view selects on the language assigned to the locale (es_CO) of the user to find the local data item value (Oro). "ORO" is displayed as the queue name in reports.

Although the tables of FIG. 3 are depicted as using a star schema and those of FIG. 4 as using a snowflake schema, any suitable schema may be employed. Additionally, denormalized models may be used instead of normalized models.

Operation of the Contact Management System

The operation of the contact management system 228 will be discussed with reference to FIGS. 5-8 and in the context of an example.

In step 800, the system 228 receives notification of an event and, in step 804, creates and/or updates data structures based on the event. Assuming, for example, that the event involves an agent named John Peters, the system 228, with reference to FIG. 5, creates an "Agent" row in an ACD administration table. FIG. 5 shows the ACD administration table data structures. In the row, the AgentName1 is John Peters (name2 will be used for localization) and John Peters gets an AdminItemID of 1.

In step 808, the translation module 250 populates the DisplayNameCategory, DisplayNameGroup, AdminItem, and optionally other associated tables. Continuing with the example and with reference to FIG. 6, the aforementioned localization tables for John Peters get populated as follows: AdminItemID 1 is assigned to the DisplayNameCategory "_User_" and the DisplayNameGroup "_Users_". Regarding other associated tables, AdminItemID 1 is assigned to SDResource=CCR (SDResource table 600), TableName=Party (ResourceTable table 604), ColumnName=DisplayName (Resource Column table 608), and RowNumber=1 (TableRowBridge table 612). The base language value for the DisplayName is "_John Peters_".

In step 812, the module 250 creates a row in LocaleAdminItem table 316 for each supported language using the existing base value as a default value. Returning to the example, LocalAdminItemName contains this value. The translation indicator is set to no. Thus, if English, French, and Italian are the supported languages, the following three new rows will be created: for the first row LocaleKey denotes English and LocalAdminItemName is John Peters, for the second row LocaleKey denotes French and LocalAdminItemName is John Peters, and for the third row LocaleKey denotes Italian and LocalAdminItemName is John Peters.

In step 816, the module 250 receives, such as from a user via a user interface or automatically via an automated translation module, a LocaleAdminItemName and LocaleAdminItemDesc in each language to replace default values, if appropriate. Returning to the example, the user localizes the LocalAdminItemName via an administration interface as follows: for the first row LocalAdminItemName is John Peters, for the second Jean Pierre, and for the third Giovanni Pietro.

In step 820, the module 250 populates the reporting database via ETL processes. As will be appreciated, ETL processes refers to a group of tools that extract data, transform it, and then load it. Returning to the example, the reporting database, after population via ETL processes, has the data structures of FIG. 7. In the PartyDim table 700, DisplayName receives the base value "_John Peters_". The DataItemLocalization table 404 has a row for each supported language (English, French, and Italian) for John Peters (3 rows). The DataItemValue is "_JohnPeters_", the DataItemKey points to DataItemTypeName=_User_and DataItemName=_Users_. The LocaleKey points to French. The DataItemKey points to DataItemTypeName=_User_and DataItemTypeName=_Users_. The DataItemValue is _JohnPeters_. The LocalDataItemValue=Jean Pierre.

The module 250 then returns to step 800.

Figure 9:
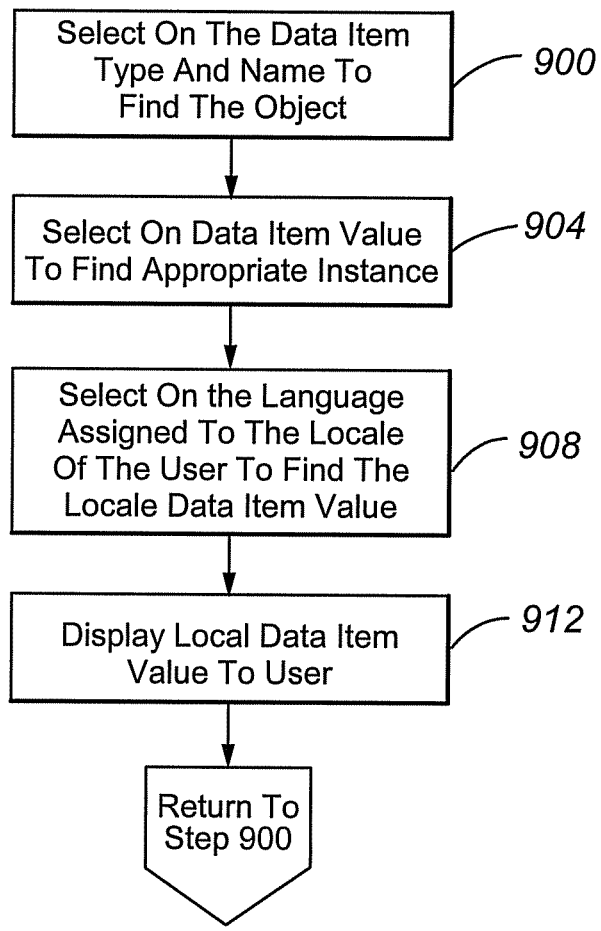
FIG. 9 is a flow chart according to an embodiment of the present invention.

Access of the localized display name will now be discussed with reference to FIG. 9. FIG. 9 presents a generic logic for a view to obtain a localized display name using DataItemLocalization tables. These steps will be discussed with reference to an example, namely a user seeking information about a queue named "gold".

In step 900, the module 250 selects on the DataItemType (e.g., RoutingConstructs) and DataItemName (e.g., Queue) (see DataItem table 412) to find the corresponding object in the DataItemLocalization table 404.

In step 904, the module 250 selects on the DataItemValue (e.g., Gold) (see DataItemLocalization table 404) to find the appropriate instance.

In step 908, once the instance is identified the module 250 selects on the language assigned to the locale of the user to find the LocalDataItemValue. The language assigned to the locale of the user can, for example, be determined from values obtained from the Web browser of the user (e.g., the user's address or URL). Using the LocaleName (see Locale table 400), the LocaleID can be determined and mapped, using the LanguageLocaleAssignment table 408, to obtain the language assigned to the LocaleID.

In step 912, the module 250 creates a table for display of the requested information, including the LocalDataItemValue, to the user. The table is then displayed to the user.

The module 250 then returns to step 900.

The exemplary systems and methods of this invention have been described in relation to contact centers. However, to avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as an adjunct processor, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

For example in one alternative embodiment, the principles of the present invention can be applied to conversions of data from one expression to another. The principles can be used, for instance, to convert data from heterogeneous, potentially autonomous, data sources to a common form of expression.

In another alternative embodiment, the principles of the present invention are used to convert source or machine language from one form to another. Any type of human or machine language can be translated using the principles of the present invention.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. The features of the embodiments of the invention may be combined in alternate embodiments other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations, combinations, and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   receiving an event notification;
   in response to receiving an event notification, creating a first set of tables defining an entity;
   in response to creating the first set of tables and when an attribute of the entity is subject to a plurality of differing forms of language expression, automatically creating a set of localization tables separate from the first set of tables, wherein the set of localization tables comprises a language locale assignment table and a locale administration item table;
   in the language locale assignment table, creating two or more locale identifiers wherein each locale identifier identifies a different location, wherein the language locale assignment table includes forms of language expression to be used for the attribute;
   in the language locale assignment table, creating two or more locale keys wherein each locale key is associated with a locale identifier;

in the locale administration item table, creating two or more rows, wherein each row corresponds to a different form of language expression for the attribute;

including a different form of language expression in each of the two or more rows in the locale administration item table;

including a locale key in each of the two or more rows in the locale administration item table, wherein the locale key associates the language expression rows in the locale administration item table with a locale identifier, in the language locale assignment table, that identifies a location; and wherein the attribute of the entity has a base value as received from a source of the event notification, wherein the base value differs from at least one of the forms of language expression, wherein the base value is included, as a dimension, in the set of localization tables, wherein a column in the first set of tables is identified by at least one of a group and category in the set of localization tables, and wherein a new form of language expression is configured to be added to the set of localization tables without adding a new table to the set of localization tables and a new column to the existing set of localization tables.

2. The method of claim 1, wherein the forms of language expression correspond to differing languages, wherein the set of localization tables comprise a display name category table, a display name group table, an administration item table, an administration locale table, a locale administration item table, and a language locale assignment table, wherein the display name category and group tables describe a column in the first set of tables by category and group, respectively, wherein the administration item table associates at least one of entities or attributes thereof with corresponding categories and groups, and wherein the administration locale table maps geographical identifiers to corresponding forms of language expression.

3. The method of claim 1, further comprising:
receiving a request for information comprising a first entity, the first attribute of the first entity having a plurality of differing forms of language expression;
using a first localization table to identify an object corresponding to the first entity;
using a second localization table and the identified object to determine a form of language expression to be used for the first attribute of the first entity; and
selecting a form of language expression for the first attribute of the first entity related to the determined form of language expression.

4. The method of claim 1, wherein the entity is at least one of contact, customer, data source, party, business role, state, trunk, communication device, routing method, queue, and resource and wherein a change to a form of language expression in the set of localization tables is not a Type 1 or Type 2 change.

5. The method of claim 1, wherein a desired form of language expression is obtained using, as an index, the base value for the attribute of the first entity, and wherein the base value is not changed.

6. A method, comprising:
a processor receiving a request for data entities, at least one of the data entities or an attribute of the data entities having a plurality of differing forms of language expression;
the processor using a first set of tables to identify an object corresponding to the at least one of the data entities;
the processor determining, with a second set of tables and the identified object, a form of language expression to be used for the at least one of the data entities or attribute of the data entities from two or more forms of language expression;
the processor determining a location associated with the request;
the processor associating the location with a locale key in a language locale assignment table, wherein the language locale assignment table includes forms of language expression to be used for the attribute;
with the locale key, the processor selecting a value for the at least one of the data entities or attribute of the data entities related to the determined form of language expression in a locale administration item table, wherein the locale administration item table includes two or more different forms of language expression for the attribute;
receiving an event notification;
in response receiving an event notification, updating a third set of tables, the third set of tables comprising data entities comprising the selected data entity;
in response updating the third set of tables and when an attribute of the data entity is subject to a plurality of differing forms of language expression, creating, in the second set of tables separate from the third set of tables, a plurality of rows corresponding to at least some of the differing forms of language expression, the second set of tables comprising a plurality of differing forms of language expression for each of a plurality of different attributes thereof; and
including differing forms of language expressions for the selected data entity in differing ones of the plurality of rows; and
wherein the selected attribute of the data entity has a base value as received from a source of the event notification, wherein the base value is included, as a dimension, in the second set of tables, wherein the base value differs from at least one of the forms of language expression, wherein a column in the third set of tables is identified by at least one of a group and category in the first set of tables, and wherein a new form of language expression can be added to the second set of tables without adding a new table to the second set tables and a new column to the existing second set of tables.

7. The method of claim 6, wherein the forms of language expression correspond to differing languages, wherein a fourth set of localization tables comprise a display name category table, a display name group table, an administration item table, an administration locale table, wherein the display name category and group tables describe at least one of a table and column in the third set of tables by category and group, respectively, wherein the administration item table associates at least one of selected data entities or attributes thereof with corresponding categories and groups, and wherein the administration locale table maps geographical identifiers to corresponding forms of language expression.

8. The method of claim 6, wherein the forms of language expression correspond to differing languages, wherein the first and second sets of tables comprise a data item table, a data item localization table, a locale table, and a language locale assignment table, wherein the data item table comprises the at least one of the data entities, the data item localization table comprises the differing forms of language expression for the at least one of the data entities, the locale table maps geographical identifiers to corresponding forms of language expression, and the language locale assignment table maps geographical identifiers to forms of language expression to be used for display purposes.

9. The method of claim 6, wherein a desired form of language expression is obtained using, as an index, the base value for the at least one of selected data entity or attribute of the data entity.

10. A non-transitory computer readable medium comprising processor executable instructions configured to perform the steps of claim 6.

11. A system, comprising:
a memory configured to store instructions;
a processor in communication with the memory configured to execute the instructions, wherein executing the instructions causes the processor to execute:
a transformation module configured to:
in response to receiving an event notification, at least one of create and update a first set of tables;
in a language locale assignment table, creating two or more locale identifiers wherein each locale identifier identifies a location, wherein the language locale assignment table includes forms of language expression to be used for an attribute;
in the language locale assignment table, creating two or more locale keys wherein each locale key is associated with a locale identifier;
in response to receiving an event notification and when at least one of an entity or an attribute of the entity is subject to a plurality of differing forms of language expression, automatically create, in a locale administration item table, separate from the first set of tables, a plurality of rows corresponding to at least some of the differing forms of language expression;
include differing forms of language expressions for the entity and/or attribute of the entity in differing ones of the plurality of rows;
including a locale key in each of the two or more rows, wherein the locale key associates the language expression with a locale identifier that identifies a location; and
wherein the entity or attribute of the entity has a base value as received from a source of the event notification, wherein the base value is included, as a dimension, in the language locale assignment and locale administration tables, wherein the base value differs from at least one of the forms of language expression, wherein a table and column in the first language locale assignment and local administration tables of localization tables, and wherein a new form of language expression can be added to the language locale assignment and locale administration tables without adding a new table to the language locale assignment and locale administration tables and a new column to the existing language locale assignment and locale administration tables.

12. The system of claim 11, wherein the forms of language expression correspond to differing languages, wherein the set of localization tables comprise a display name category table, a display name group table, an administration item table, an administration locale table, a locale administration item table, and a language locale assignment table, wherein the display name category and group tables describe at least one of a table and column in the first set of tables by category and group, respectively, wherein the administration item table associates entities and/or attributes thereof with corresponding categories and groups, wherein the administration locale table maps geographical identifiers to corresponding forms of language expression.

13. The system of claim 11, wherein the processor is further operable to:
receive a request for information comprising a first entity, the first entity or an attribute of the first entity having a plurality of differing forms of language expression;
use a first localization table to identify an object corresponding to the first entity;
use a second localization table and the identified object to determine a form of language expression to be used for the first entity and/or attribute of the first entity; and
select a form of language expression for the first entity and/or attribute of the first entity related to the determined form of language expression.

14. The system of claim 11, wherein the entity is at least one of contact, customer, data source, party, business role, state, trunk, communication device, routing method, queue, and resource.

15. The system of claim 11, wherein a desired form of language expression is obtained, using, as an index, the base value for the entity and/or attribute of the first entity.

16. The system of claim 11, wherein a form of language expression of the base value may be changed without changing the base value.

17. The system of claim 11, wherein a selected entity has a plurality of differing forms of language expression, each form of language expression having a corresponding row in the set of localization tables, wherein the selected entity has at least first and second different base values, wherein the first and second base values have corresponding first and second time intervals of use, and wherein the first and second time intervals are different and nonoverlapping.

* * * * *

UNITED STATES PATENT AND TRADEMARK OFFICE
CERTIFICATE OF CORRECTION

| | | |
|---|---|---|
| PATENT NO. | : 8,504,534 B1 | Page 1 of 1 |
| APPLICATION NO. | : 11/861857 | |
| DATED | : August 6, 2013 | |
| INVENTOR(S) | : Tendick et al. | |

It is certified that error appears in the above-identified patent and that said Letters Patent is hereby corrected as shown below:

In the Claims

Column 17, Line 50, Claim 4; delete "of contact" and add "of a contact"

Column 18, Line 42, Claim 6; delete "set tables" and add "set of tables"

Column 19, Line 3, Claim 9; delete "of selected" and add "of the selected"

Column 19, Line 46, Claim 11; delete "local" and add "locale"

Column 19, Line 47, Claim 11; delete "of localization tables"

Column 20, Line 32, Claim 14; delete "of contact" and add "of a contact"

Signed and Sealed this
Third Day of February, 2015

Michelle K. Lee
*Deputy Director of the United States Patent and Trademark Office*